United States Patent
Hara

(10) Patent No.: US 7,055,509 B2
(45) Date of Patent: Jun. 6, 2006

(54) BREATHER DEVICE OF ENGINE

(75) Inventor: Yoshihiro Hara, Hamamatsu (JP)

(73) Assignee: Suzuki Kabushiki Kaisha, Hamamatsu (JP)

( * ) Notice: Subject to any disclaimer, the term of this patent is extended or adjusted under 35 U.S.C. 154(b) by 62 days.

(21) Appl. No.: 10/749,395

(22) Filed: Jan. 2, 2004

(65) Prior Publication Data

US 2004/0200462 A1   Oct. 14, 2004

(30) Foreign Application Priority Data

Jan. 9, 2003  (JP) .............................. 2003-003711

(51) Int. Cl.
   *F02M 13/00*   (2006.01)
(52) U.S. Cl. .................................... 123/572
(58) Field of Classification Search ........ 123/572–574, 123/41.86
   See application file for complete search history.

(56) References Cited

U.S. PATENT DOCUMENTS

| | | | | |
|---|---|---|---|---|
| 2,359,485 A * | 10/1944 | Lowther | ..................... | 123/574 |
| 4,607,604 A * | 8/1986 | Kanoh et al. | ................ | 123/572 |
| 6,237,577 B1 * | 5/2001 | Takahashi et al. | .......... | 123/572 |
| 6,334,438 B1 * | 1/2002 | Itoh et al. | .................... | 123/572 |
| 6,394,079 B1 * | 5/2002 | Takada et al. | ............... | 123/572 |
| 6,460,524 B1 * | 10/2002 | Kimura | ....................... | 123/572 |
| 6,598,595 B1 * | 7/2003 | Yasui | .......................... | 123/572 |
| 6,725,850 B1 * | 4/2004 | Kurasawa et al. | .......... | 123/572 |
| 6,763,814 B1 * | 7/2004 | Gokan | .......................... | 123/572 |
| 6,834,643 B1 * | 12/2004 | Hori et al. | ................... | 123/572 |
| 2001/0032635 A1 * | 10/2001 | Kimura | ....................... | 123/572 |

* cited by examiner

*Primary Examiner*—Marguerite McMahon
(74) *Attorney, Agent, or Firm*—Oblon, Spivak, McClelland, Maier & Neustadt, P.C.

(57) ABSTRACT

A breather device of an engine is connected to an engine suction system. A breather chamber thereof for separating a blowby gas generated inside a crank chamber of the engine into gas and liquid is formed so as to face to a mating face of a plurality of cases, including a crankcase, connected to each other via a gasket, and a communication port is formed to the gasket, through which the blowby gas comes and goes in a space within the plurality of cases to thereby carry out the gas-liquid separation of the blowby gas. A cam chamber receiving a cam for driving a valve train provided for a cylinder head of the engine is arranged at a connection portion of the plurality cases including the crankcase in a sectioned manner in adjacent to the crank chamber in an axial direction of the crankshaft, and the breather chamber is formed above the cam chamber, the breather chamber being provided with a main opening so as to face to the cam chamber.

10 Claims, 15 Drawing Sheets

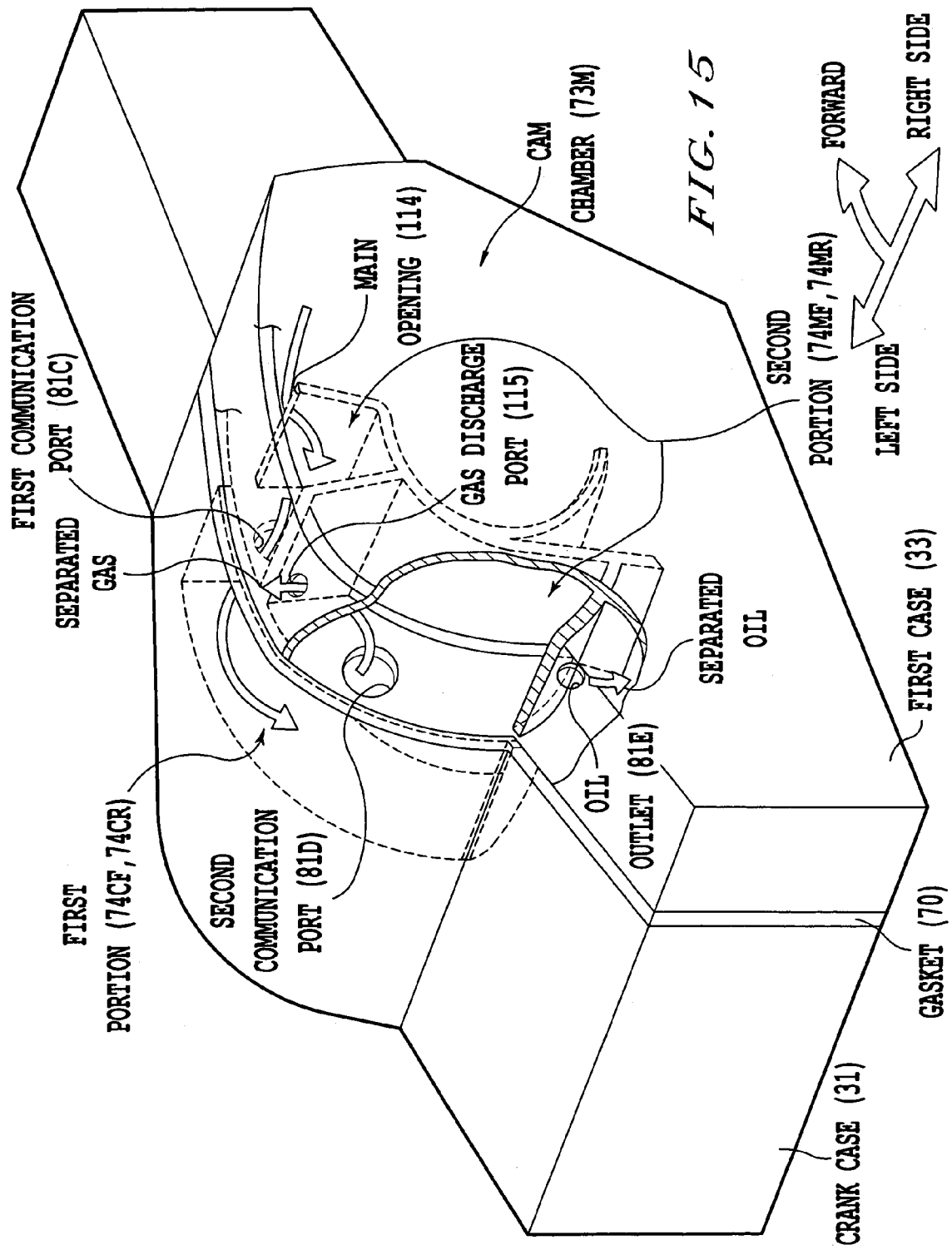

BREATHER DEVICE OF ENGINE

BACKGROUND OF THE INVENTION

1. Field of the Invention

The present invention relates to a breather device of an engine.

2. Related Art

In an engine of a vehicle, for example, a motorcycle, a gas accompanying a pressure generated within a cylinder bore leaks out into a crankcase little by little through a gap between a piston and the cylinder bore. Further, since the pressure of the gas within the crankcase always changes in correspondence to a sliding motion of the piston, the pressure of the gas, so-called a blowby gas within the crankcase, in a sealed state, prevents the motion of the piston. Accordingly, it is necessary to provide a means for separating a spray-like (sprayed) oil component (an oil mist) mixed in the blowby gas from a gas component as well as releasing the pressure within the crankcase to an external portion, that is, a breather device.

In order to improve a gas-liquid separating performance of the oil component in the blowby gas, it is desirable to increase a capacity of a breather chamber constituting the breather device, and to form an inner side of the breather chamber in a labyrinth structure.

As an example of a specific structure of the breather device, there is a structure in which a PCV chamber (corresponding to the breather chamber) having a plurality of baffle plates arranged in a zigzag manner in an inner portion thereof is arranged on an engine, and an expansion chamber within the crankcase and the PCV chamber are connected by a suction tube, for example, shown in Japanese Patent Laid-Open (KOKAI) Publication No. SHO 61-118521.

As shown in Japanese Utility Model Laid-Open (KOKAI) Publication No. HEI 2-46012, there is a structure in which a balance gear chamber is formed in one side of the engine by a crankcase and a gear cover connected to the crankcase via a gasket, a breather chamber sectioned by the gasket is formed in the crankcase and the gear cover, and the breather chamber and the balancer gear chamber are communicated through a breather passage.

Recently, an atmospheric pollution is prevented by reflowing the blowby gas to an air cleaner for reburning.

However, in the breather device described in Japanese Patent Laid-Open Publication No. SHO 61-118521, since the breather chamber is provided separately from the engine and is connected thereto by means of suction tube, the number of parts and assembling steps are increased, which causes a cost increase.

SUMMARY OF THE INVENTION

The present invention was conceived by taking the matters mentioned above into consideration, and an object of the present invention is to provide a breather device for an engine in which a high gas-liquid separating performance can be achieved by a simple and compact structure.

Another object of the present invention is to provide a breather device for an engine for a vehicle capable of providing a high rigidity and excellent durability, providing a power unit having light weight and compact structure, achieving a design having a low gravity point by utilizing the power unit, and obtaining a good running stability, even if the vehicle has a small-diameter wheel.

These and other objects can be achieved according to the present invention by providing, in one aspect, a breather device in an engine, connected to an engine suction system, in which a breather chamber for separating a blowby gas generated inside a crank chamber of an engine into gas and liquid is formed so as to face to a mating face of a plurality of cases, including a crankcase, connected to each other via a gasket, and a communication port formed on the gasket, through which the blowby gas comes and goes in a space in the plurality of cases to thereby carry out the gas-liquid separation of the blowby gas, wherein a cam chamber receiving a cam for driving a valve train provided for a cylinder head of the engine is arranged at a connection portion of the plurality cases including the crankcase in a sectioned manner adjacent to the crank chamber in an axial direction of the crankshaft, and the breather chamber is formed above the cam chamber, said breather chamber being provided with a main opening so as to face to the cam chamber.

In another aspect, the above objects can be also achieved by providing a breather device in an engine, connected to an engine suction system, in which a breather chamber for separating a blowby gas generated inside a crank chamber of an engine into gas and liquid is formed so as to face to a mating face of a plurality of cases, including a crankcase, connected to each other via a gasket, and a communication port formed on the gasket, through which the blowby gas comes and goes in a space in the plurality of cases to thereby carry out the gas-liquid separation of the blowby gas, wherein said breather chamber is sectioned in adjacent to the crank chamber and is arranged in adjacent to an upper side of another communication chamber, a main opening of the breather chamber is formed so as to face to the another chamber, a communication port for communicating the breather chamber and an oil pan formed in a bottom portion of a plurality of cases with the gasket is arranged near a lowermost end of the breather chamber, and the communication port is formed in a manner overlapping with a rib defining the breather chamber from the oil pan so as to reflow an oil component, which is subjected to gas-liquid separation in the breather chamber, from the communication port to the oil pan.

In these aspect, the cam chamber may be separated into one chamber communicated with a valve train chamber receiving the valve train and another chamber by the gasket interposed between a plurality of cases, both the chambers being communicated through an opening portion formed in the gasket, and a main opening of the breather chamber formed so as to face to the cam chamber may be arranged on the another chamber side.

The engine performs a splash lubrication within the crank chamber, an oil passage for introducing a lubricating oil from an oil pan within the crank chamber to the valve train chamber is formed, and a communication passage for communicating the valve train chamber with the cam chamber is formed so as to communicate the lubricating oil and the blowby gas from the valve train chamber.

A plurality of cases may include a front crankcase and a rear crankcase forming the crankcase, and a magnet case connected from a side portion of the crankcase, and the breather chamber is formed so as to face to a mating face of these three cases.

As described above, in accordance with the breather device of the present invention, it is possible to obtain a labyrinth structure having a high gas-liquid separating performance while comparatively simplifying the structure of the case itself. It is also possible to reduce an amount of the oil component in the blowby gas flowing into the breather chamber and to restrain the oil component from flowing out to an intake system.

It is also possible to obtain a high supporting rigidity of the crankshaft, effectively utilize a dead space around the cam chamber in comparison with a locus of a crank web received in the crank chamber, and it is also possible to make the power unit compact.

Furthermore, it is possible to improve an effect of flowing the blowby gas into the breather chamber in the opposite direction to the relief of the oil component, it is easy to form the opening in the gasket and to control the position, and it is possible to restrain the oil component from flowing out to the intake system. The relief of the separated oil component moves downward as a wall flow along the gasket and never ascend again.

In addition, it is possible to temporarily buffer the blowby gas not only from the crank chamber but also from the valve train chamber in the cam chamber so as to take in the breather chamber and improve the gas-liquid separating performance.

Still furthermore, it is possible to arrange the rib to the mating face position at a time of mating a plurality of cases, secure a sealing property of these cases near the coupling position and improve a sound insulating property. An internal face of a plurality of cases becomes complex, which can contribute to a labyrinth structure having a high gas-liquid separating performance.

BRIEF DESCRIPTION OF THE DRAWINGS

FIG. 15 illustrates a perspective view of an embodiment of the breather device of the invention.

DESCRIPTION OF THE PREFERRED EMBODIMENT

An preferred embodiment of a breather device of the present invention will be described with reference to the accompanying drawings.

Figure 1:
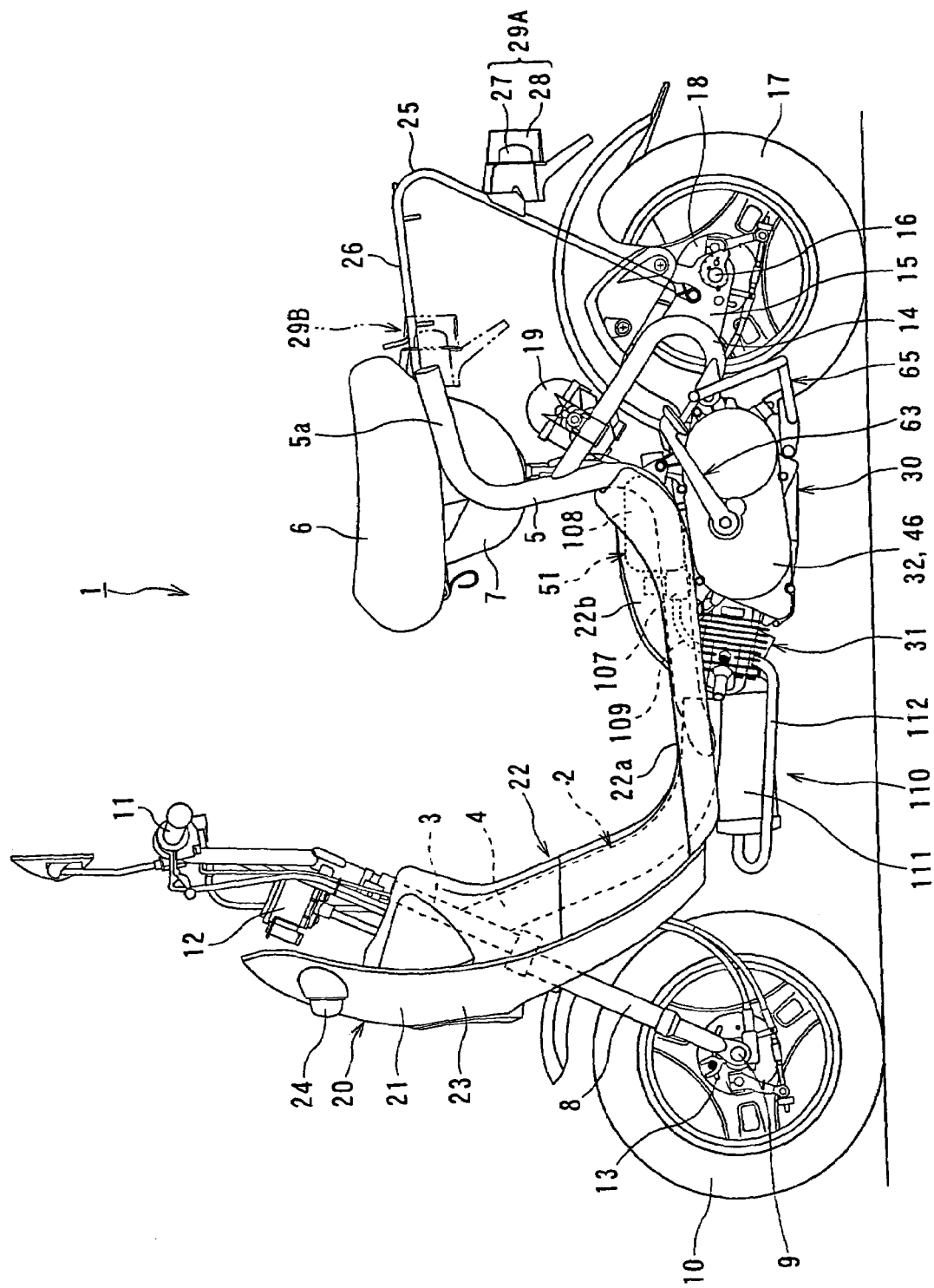
FIG. 1 is a left side elevational view of a scooter type motorcycle showing an embodiment of a breather device of an engine in accordance with the present invention.
Figure 2:
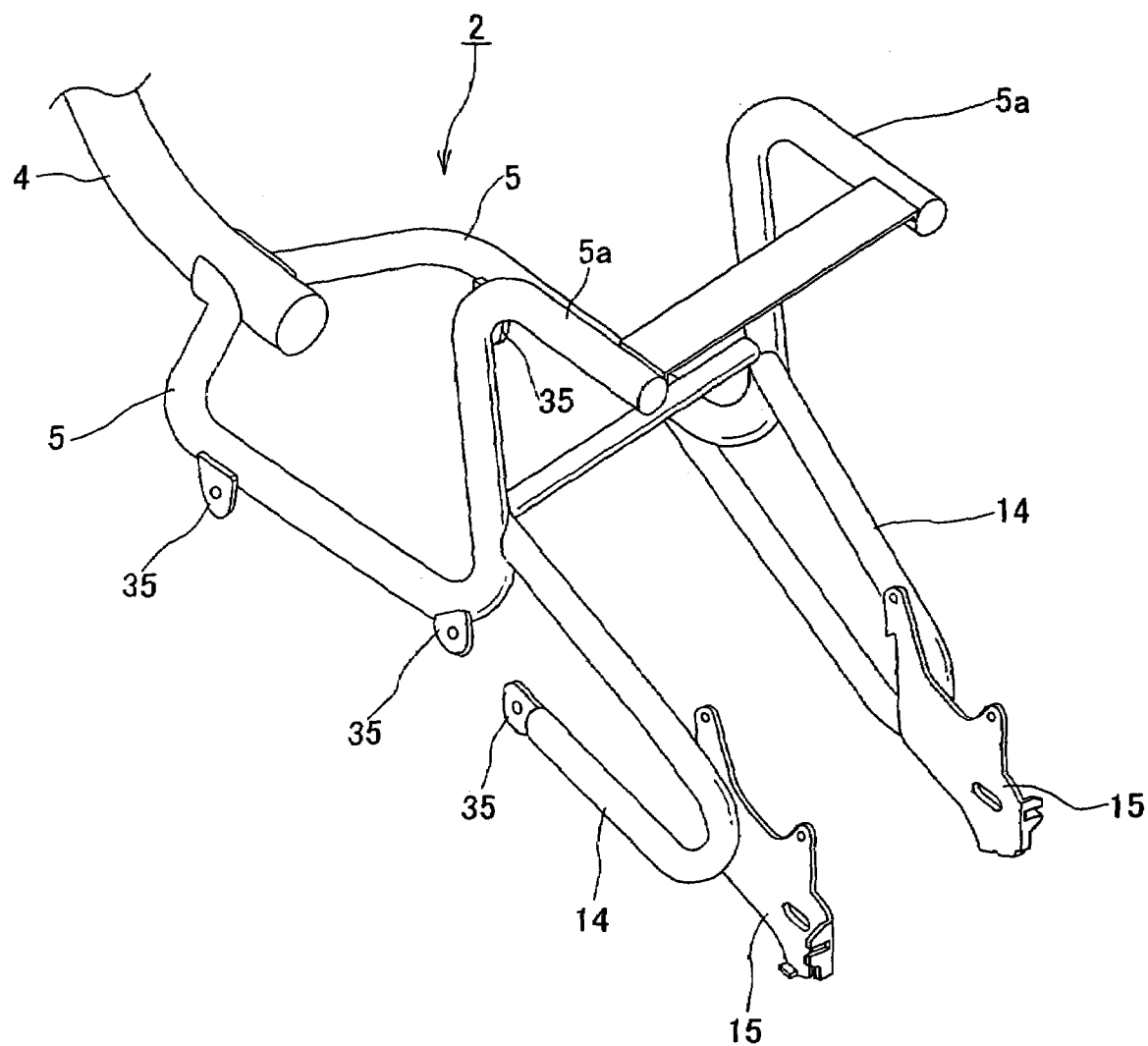
FIG. 2 is a perspective view of a vehicle body frame as seen obliquely from a rear side.

FIG. 1 is a left side elevational view showing an embodiment of a scooter type motorcycle to which the present invention is applicable, and as shown in FIG. 1, a motorcycle 1 has a vehicle body frame 2. FIG. 2 is a perspective view of the vehicle body frame 2 as seen obliquely from a rear side.

As shown in FIGS. 1 and 2, the vehicle body frame 2 is constituted by a down tube 4 which extends obliquely toward a rear downward side from a head pipe 3 and is bent on the way so as to approximately horizontally extend toward a rear side. A pair of right and left main frames 5, which temporarily extend rearward from a rear end of the down tube 4, extend approximately vertically toward an upper side and, thereafter, extend approximately horizontally again toward a rear side.

As shown in FIG. 1, a seat 6 is arranged on a seat rail portion 5a above the main frame 5, and a fuel tank 7 is arranged in a lower portion of the driver seat 6.

A pair of right and left front forks 8 are pivotally attached to the head pipe 3 provided in a front end of the down tube 4 so as to freely rotate to right and left sides, a front axle shaft 9 is installed in lower end portions of both the front forks 8, and a front wheel 10 is rotatably supported by the front axle shaft 9. A handle bar 11, meters 12 and the like are provided in an upper portion of both the front forks 8, and the front wheel 10 is steered to the left and right sides through the operation of the handle bar 11. In this case, for example, a drum type front brake 13 is coaxially provided to the front wheel 10.

On the other hand, a pair of right and left stay frames 14 (FIGS. 1 and 2), bent in an approximately V shape in a side view, are provided in a rear portion of the main frame 5 so as to extend toward a rear downward direction. One of the stay frames 14 is provided with a discontinuous portion in a front side lower portion thereof. Support stays 15 are respectively provided in the bent portions of both the stay frames 14, and a rear wheel 17 is rotatably pivoted by a rear axle shaft 16 installed between the support stays 15. In this case, for example, a drum type rear brake 18 is coaxially provided in the rear wheel 17.

A battery case 19 (FIG. 1) is installed between the right and left stay frames 14, in an exposed manner, close to an upper side of an upper middle portion of the stay frame 14 positioned in the rear lower portion of the fuel tank 7, and a battery (not shown) is received in an inner portion thereof.

According to the present invention, the rear wheel 17 of the motorcycle 1 employs a suspension structure without a cushioning device such as a shock absorber or the like which has been used conventionally in a lot of the same type of motorcycles, and an impact applied from a road surface or the like can be buffered by a tire elasticity of the rear wheel 17 and the driver seat 6. In the case that the impact from the road surface is great, the impact can be buffered by a body flexibility of the vehicle body frame 2 itself and a rider.

Figure 3:
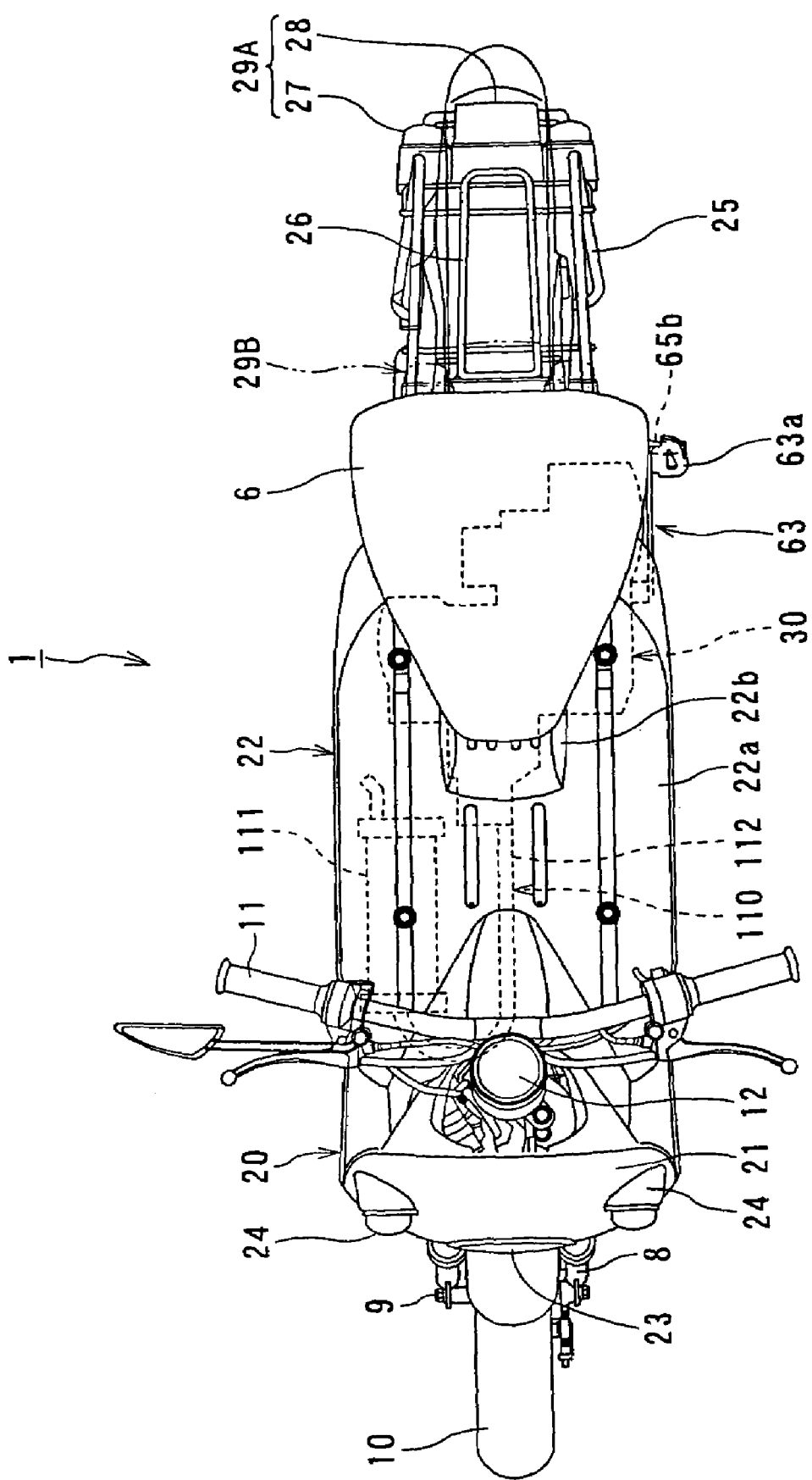
FIG. 3 is a plan view of the motorcycle shown in FIG. 1.
Figure 4:
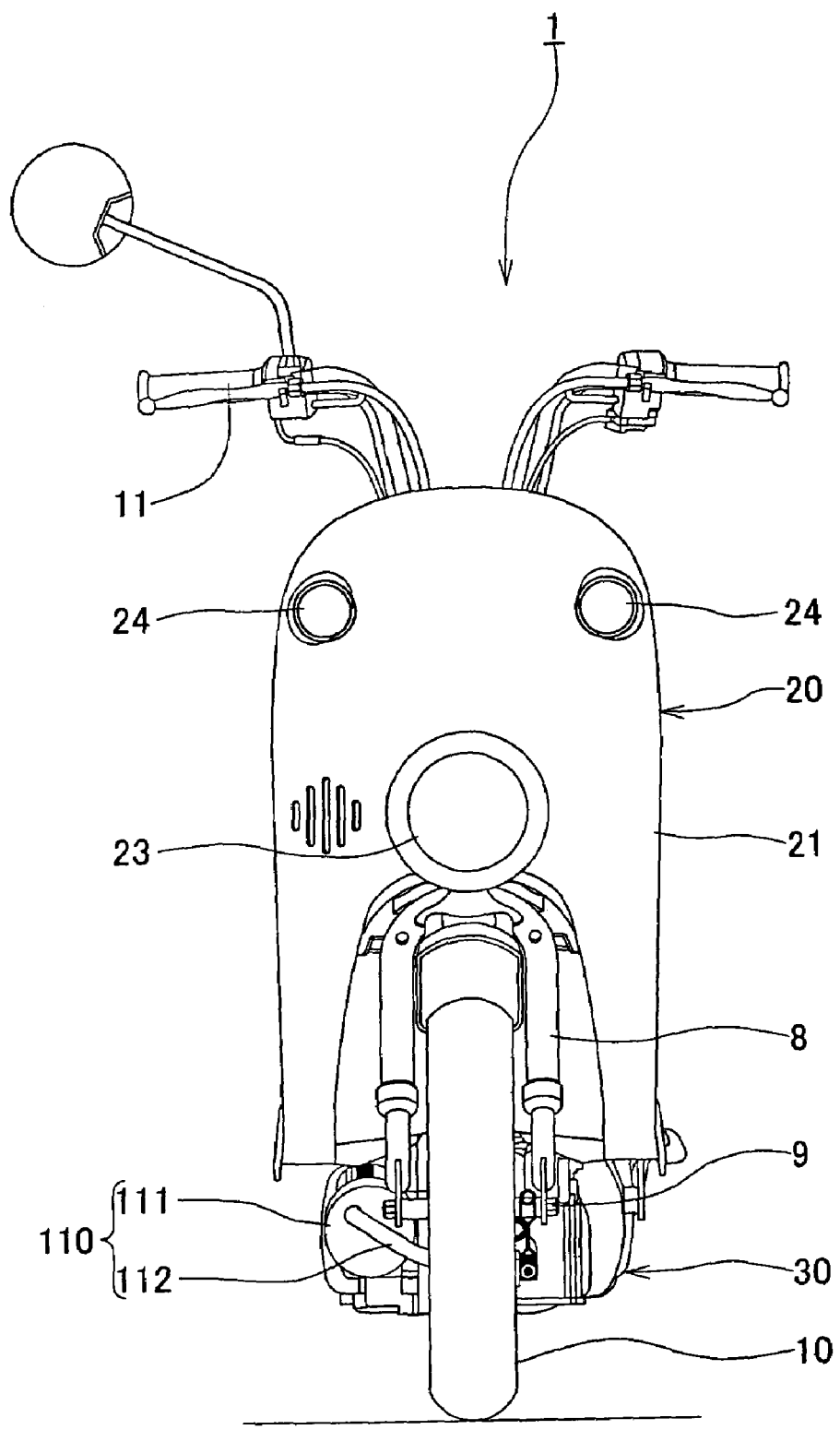
FIG. 4 is a front elevational view of the motorcycle shown in FIG. 1.

FIG. 3 is a plan view of the motorcycle 1 shown in FIG. 1, and FIG. 4 is a front elevational view of the motorcycle 1 shown in FIG. 1. The vehicle body frame 2 is covered by a vehicle body cover 20 from a front portion thereof to a center portion, and an outer appearance of the vehicle is structured by the vehicle body cover 20, as shown in FIGS. 1, 3 and 4. The vehicle body cover 20 is structured by assembling a plurality of cover elements. The cover elements are specifically structured by a front leg shield 21, a rear leg shield 22 (FIG. 3) and the like.

The portion between the driver seat 6 and the handle bar 11 is largely curved toward the downward direction (FIG. 1), and a rear leg shield 22 provided with a step board portion 22a (FIG. 3) on which a rider puts both feet is arranged in a bottom portion thereof. The rear leg shield 22 is arranged so as to cover a horizontal portion of the down tube 4 from the upper side thereof, and a front portion thereof rises upward so as to cover a rear portion of the rising portion of the down tube 4 and a rear portion of the head pipe 3 (FIG. 1).

The front leg shield 21 is arranged on a side opposite to the rising portion of the rear leg shield 22 with respect to the head pipe 3, and the front leg shield 21 is fixed in such a manner as to cover the head pipe 3 and the front fork 8 from the front side (FIG. 1). In this case, the cover elements are molded by a plastic resin material, for example, a PP resin, an ABS resin or the like.

A head light 23 is provided in the front leg shield 21 just above the front wheel 10, and a pair of right and left front turn signal lights 24 are provided in the front leg shield 21 above the head light 23. On the other hand, a carrier frame 25 is detachably mounted between a rear end of a seat rail portion 5a of the main frame 5 and a support stay 15 of a stay frame 14, and a rear carrier 26 is provided on the carrier frame 25 at the rear portion of the driver seat 6.

A pair of right and left rear turn signal lights 27 and a combination lamp 29A constituted by a tail/stop lamp 28 arranged between the rear turn signal lights 27 are provided at a rear portion of the carrier frame 25. When disassembling the carrier frame 25, a combination lamp 29B is arranged at a rear portion of the driver seat 6, as shown in an imaginary line (a chain double-dashed line) in FIGS. 1 and 3.

Figure 5:
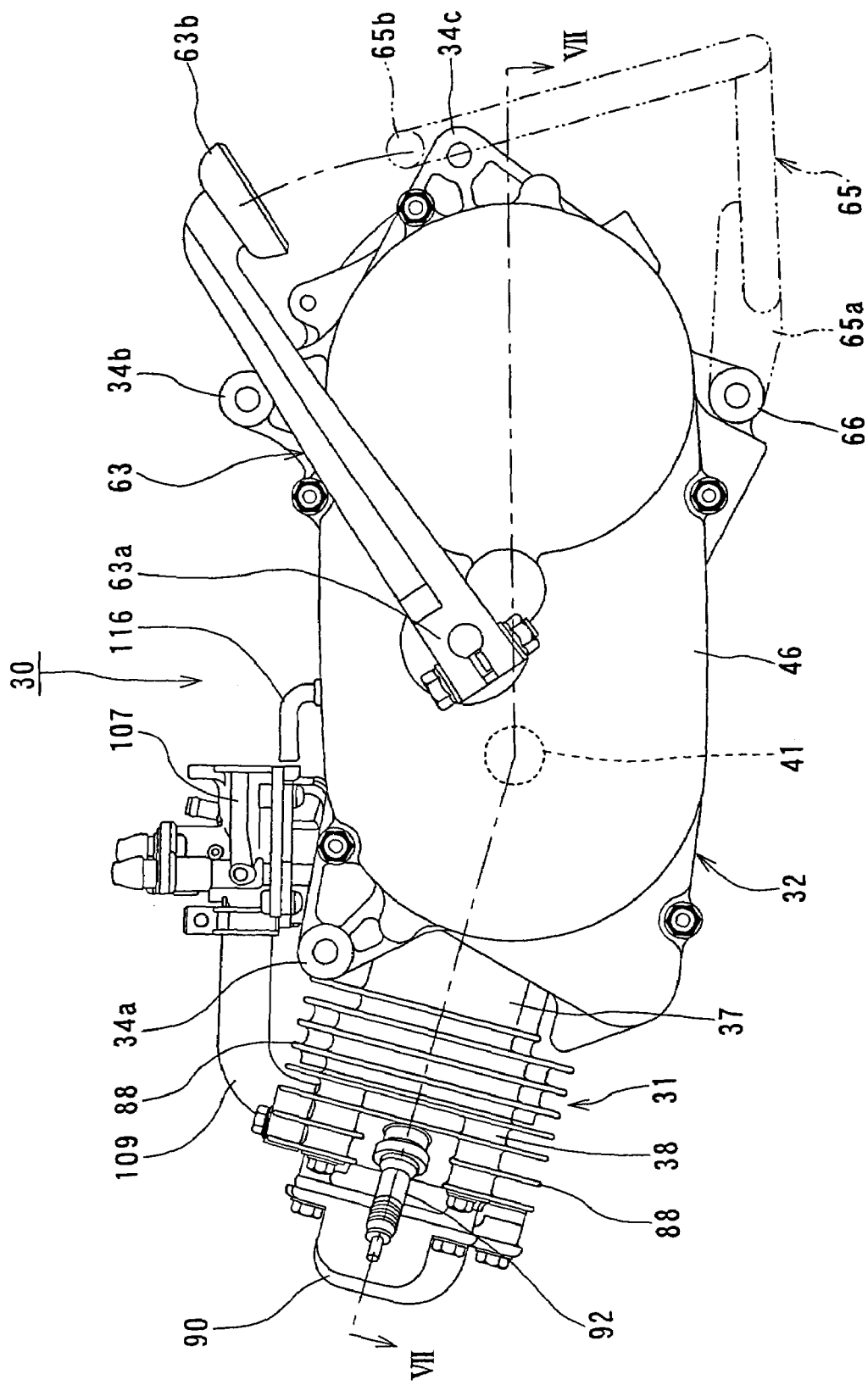
FIG. 5 is a left side elevational view of a power unit, in an enlarged scale.

As shown in FIGS. 1 and 3, a power unit 30 is arranged on a lower rear side of the step board portion 22a. FIG. 5 is an enlarged left side elevational view of the power unit 30, and FIG. 6 is a plan view thereof.

Figure 6:
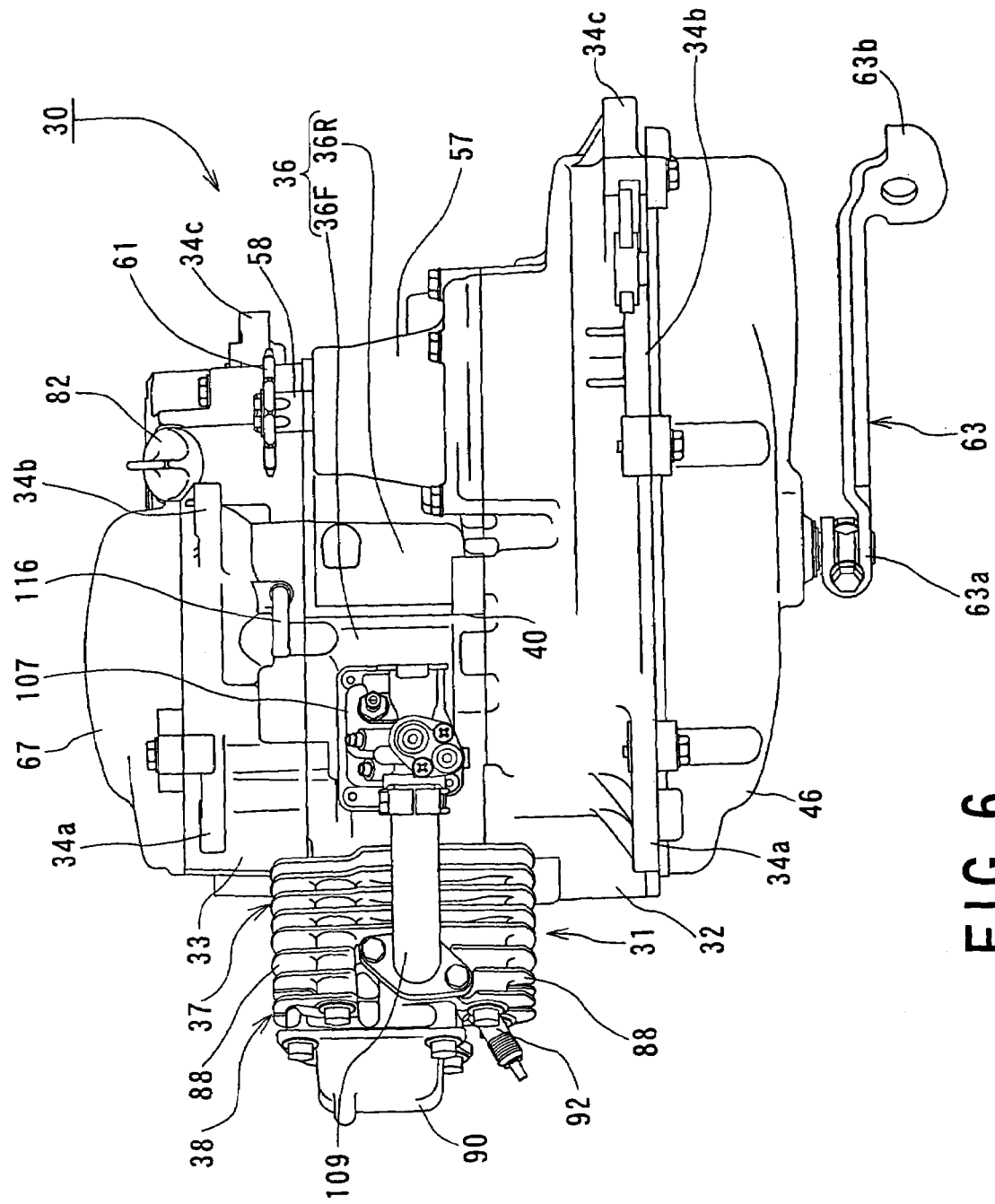
FIG. 6 is a plan view of the power unit.

As shown in FIGS. 5 and 6, the power unit 30 is integrally provided with an engine 31, a transmission case 32 extending rearward from one side of the engine 31 (i.e., a left side in the present embodiment), and a magnet case 33 arranged in one side of the engine 31 (I.e., a right side in the present embodiment).

The power unit 30 is also provided with suspension bosses 34 on an upper surface thereof, for example, in a plurality of right, left, front and rear positions. More specifically, the suspension bosses 34 are arranged in front and rear sides and at a portion therebetween at the end portions of the transmission case 32 and the magnet case 33 constituting both side portions of the power unit 30.

In the present embodiment, for example, a suspension boss 34a in a front portion and a suspension boss 34b in a middle portion are attached and fixed to a suspension bracket 35 (refer to FIG. 2) of the main frame 5. A suspension boss 34c in a rear portion is further attached and fixed to the suspension bracket 35 of the stay frame 14, respectively. Further, by supporting the power unit 30 by means of suspension bosses 34, the discontinuous portion provided to the stay frame 14 is supplemented, for example, by the transmission case 32 constituting the power unit 30, and the rigidity thereof is achieved by forming an annularly closed structure. In this case, the suspension boss 34 may be constituted, in one side, by a single suspension boss, not by a plurality of suspension bosses, at front and rear portions.

The power unit 30 can be suspended at both end positions in a vehicle width direction by the arrangement of these suspension bosses 34 and a support span can be secured to be long even in the case that the power unit 30 has a compact structure, so that a high supporting rigidity can be obtained.

Next, as shown in FIGS. 5 to 8, the engine 31 structuring the power unit 30 is mainly constituted by a crankcase 36, a cylinder block 37 and a cylinder head 38. The cylinder block 37 is provided in a front portion of the crankcase 36 approximately horizontally, in a state of being tilted slightly upward in the present embodiment, and the cylinder head 38 is provided in a front portion of the cylinder block 37.

The crankcase 36 is separated into two pieces in a longitudinal direction by a mating face 40 which is orthogonal to a cylinder axis 39 (refer to FIG. 8) and is constituted by a front crankcase 36F in a front side and a rear crankcase 36R in a rear side. A cylinder block 37 is integrally formed in the front crankcase 36F. Further, a crankshaft 41 is arranged horizontally on the mating face 40 of the crankcase 36 in the vehicle width direction, that is, in a direction orthogonal to a vehicle travelling direction.

A pair of crank webs 41a (FIG. 8) are formed approximately in a middle portion of the crankshaft 41 so as to be apart from the crankshaft 41 in an axial direction, and a crank pin 41b is eccentrically formed therebetween. A journal portion 41c (FIG. 7) in an outer side of the crank web 41a in the crankshaft 41 is rotatably supported, for example, by a pair of right and left ball bearings 42 provided in the crankcase 36 (FIG. 7).

Figure 8:
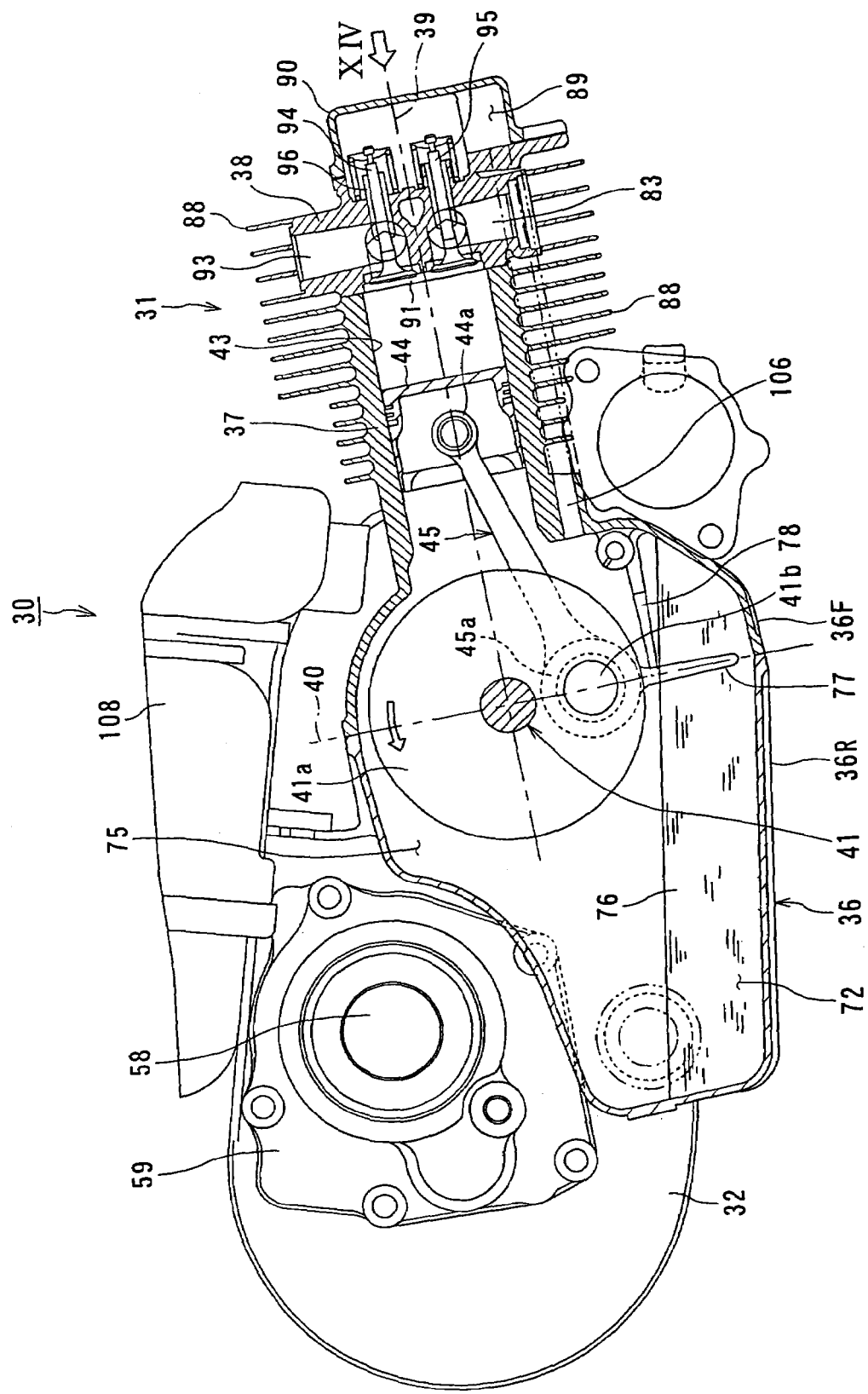
FIG. 8 is a cross sectional view taken along a line VIII—VIII in FIG. 7.

On the other hand, a piston 44 is slidably inserted to a cylinder 43 formed in an inner portion of the cylinder block 37, and a piston pin 44a of the piston 44 and a crank pin 41b of the crankshaft 41 are connected by means of connection rod 45, whereby a reciprocal motion of the piston 44 within the cylinder 43 is converted into a rotational motion of the crankshaft 41 (FIG. 8).

Figure 7:
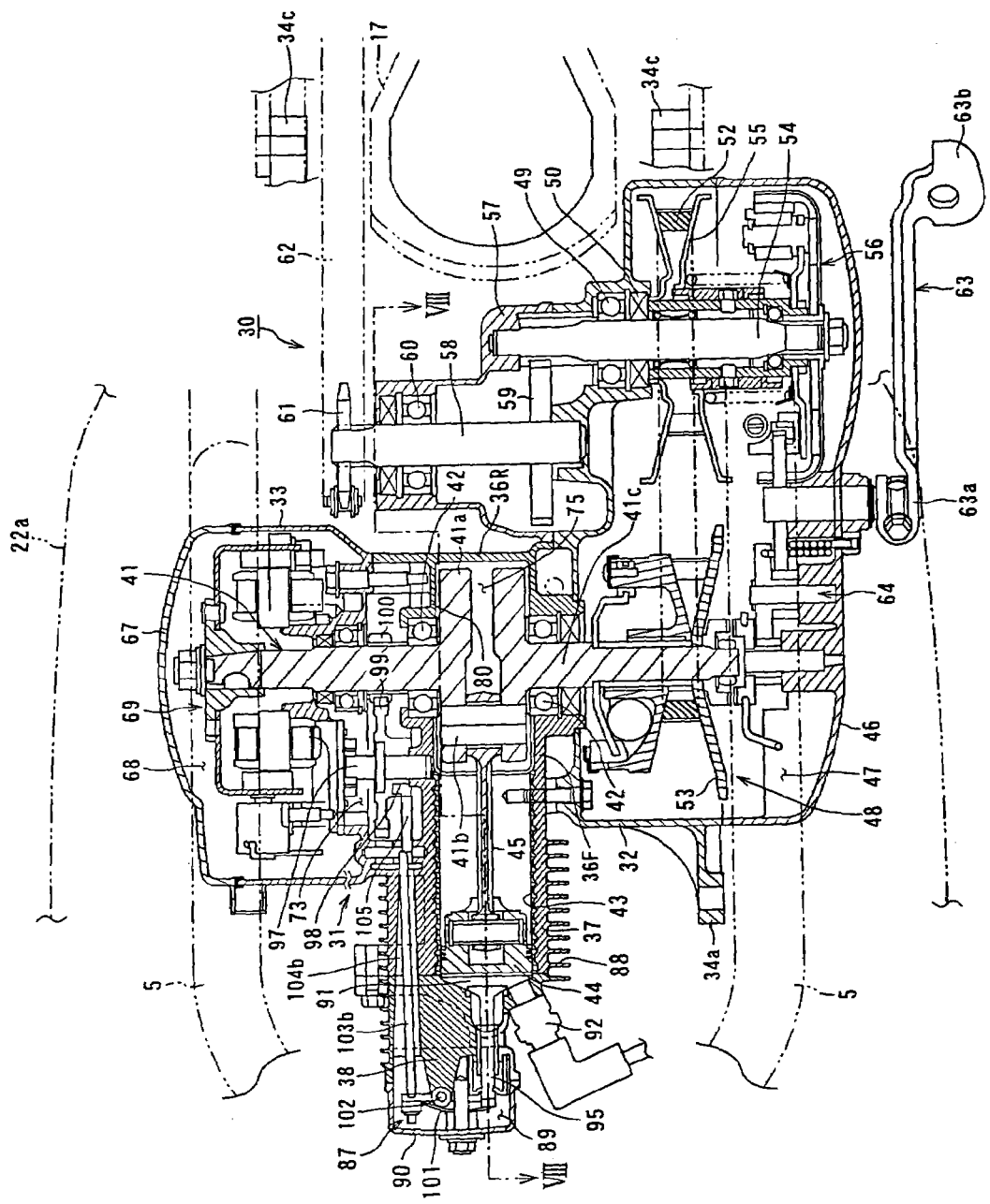
FIG. 7 is a cross sectional view taken along a line VII—VII in FIG. 5.

The transmission case 32 connected so as to cover approximately an entire side surface from the left side of the crankcase 36 is covered by a transmission cover 46 so as to form a belt chamber 47 in an inner portion thereof, and a V-belt type automatic transmission device 48 is arranged in the belt chamber 47 (FIG. 7). The transmission case 32 and the transmission cover 46 are formed in an approximately oval shape extending back and forth in a side view, and a rear end thereof is lapped over a front portion of the rear wheel 17 in a side view (refer to FIG. 1).

The belt chamber 47 is designed to have a large capacity, has a heat insulation and sound insulation structure so as to reduce an interaction between the crankcase 36 and the transmission case 32 and to secure a location space for a bearing 49, a seal member 50 and the like. As shown in FIGS. 5 and 7, a lower end of the transmission cover 46 is set above lowermost end surface of the crankcase 36, and an upper end of the transmission cover 46 is also set above the upper end surface of the crankcase 36 and below the upper end of an intake system 51 (FIG. 1, as mentioned below). A V-belt 52 (FIG. 7, as mentioned below) received in the belt chamber 47 can be designed to have a sufficient length for obtaining a durability, and a sufficient bank angle can be secured, whereby it is possible to prevent an interference with a road surface generated at a time when the vehicle is tilted.

As shown in FIG. 7, a drive pulley 53 of the V-belt type automatic transmission device 48 is mounted to the crankshaft 41 close to the transmission case 32, i.e., to a left end portion in the present embodiment. Further, a driven pulley 55 is rotatably supported to a driven shaft 54 provided at a rear portion of the transmission case 32, and the driving force of the engine 31 is transmitted to the driven pulley 55 from a drive pulley 53 through the V-belt 52. In other words, the crankshaft 41 is a main driving shaft of the V-belt 52, and the driven shaft 54 is a driven shaft of the V-belt 52.

The driving force of the engine 31 transmitted to the driven pulley 55 is then transmitted to the driven shaft 54 through a centrifugal clutch mechanism 56 arranged coaxially with the driven shaft 54. The driven shaft 54 is rotatably pivoted to the transmission case 32, for example, by a ball bearing 49, one end of the driven shaft 54 protrudes toward a center side in the vehicle width direction, and a reduction gear case 57 is provided between the protruding portion of the driven shaft 54 and the crankshaft 41 slightly close to the driven shaft 54.

As also shown in FIG. 7, a drive shaft 58 corresponding to a reduction shaft is arranged within the reduction gear case 57 in parallel to the crankshaft 41 and the driven shaft 54, above the crankshaft 41 and the driven shaft 54, approximately at the same height as the rear axle shaft 16, though not shown in detail, and is operatively connected to the protruding portion of the driven shaft 54 via the reduction gear 59. Further, the drive shaft 58 is rotatably pivoted to the reduction gear case 57, for example, by a ball bearing 60, one end of the drive shaft 58 protrudes toward an outer side in the vehicle width direction, and a drive sprocket 61 is provided in the protruding end.

A driven sprocket, not shown, is provided in the rear wheel 17 in a manner that the driving force of the engine 31 is transmitted to the rear wheel 17 by winding a drive chain 62 around both the sprockets. In this case, the drive shaft 58 is positioned on the forward side from the driven shaft 54, whereby it is possible to make a longitudinal length of the power unit 30 short and compact, and it is also possible to secure a length of the drive chain 62. Further, the drive shaft 58 is arranged approximately at the same height as the rear axle shaft 16, ensuring the height of the drive chain 62 transmitting the power to the rear wheel 17 having a small diameter from the road surface.

Since there is provided no member corresponding to a swing arm which has been conventionally employed for the same type machines as the vehicle, a positional relation between the drive shaft 58 and the rear axle shaft 16, that is, a distance between these shafts does not basically change regardless of the running state of the vehicle.

The power unit 30 is provided with a kick-type engine starting device 64 having a kick pedal 63 (FIGS. 1, 3, 5, 6, and 7). The kick pedal 63 constituting the engine starting device 64 is arranged to the side portion of the transmission cover 46 and is provided so as to extend out in a longitudinal direction in a rearward ascended state.

A base end portion 63a of the kick pedal 63 is pivoted to the transmission cover 46 between the drive pulley 53 and the driven pulley 55 and at an inner position of the V-belt 52. A free end portion of the kick pedal 63 is positioned in a side upper portion at a rear end of the transmission cover 46 and has a foothold portion 63b having an upside down bowl shape.

On the other hand, a main stand 65 (FIG. 1) is provided on a lower side of the power unit 30. A base end portion 65a of the main stand 65 is pivoted so as to be acceptable in the lower surface of the power unit 30 toward a stand boss 66 formed on a rear side from the base end portion 63a of the kick pedal 63 (FIG. 5). Further, a position of a lower inner surface of the footrest portion 63b is set so as to almost overlay with the upper end portion 65b of the main stand 65 (refer to FIG. 3) under a received state (refer to FIG. 1), and the upper end portion 65b of the main stand 65 bent approximately in an L-shape at a time of receiving the main stand 65 is brought into contact with the lower inner surface of the footrest portion 63b of the pedaled-down kick pedal 63, thereby restraining a kicking motion.

The magnet case 33 connected to cover approximately the entire side surface from the right side of the crankcase 36 is covered by a magnet cover 67 (FIG. 7) so as to form a magnet chamber 68 in an inner portion thereof, a magnet device 69 is received in the magnet chamber 68, and a right end portion of the crankshaft 41 is connected to the magnet device 69.

As described above, the power unit 30 has an approximately H-shaped structure, in a plane, which clamps and reinforces the mating face and the opening end of the longitudinally separated crankcases 36 by the right and left transmission cases 32 and the magnet cases 33.

Figure 9:
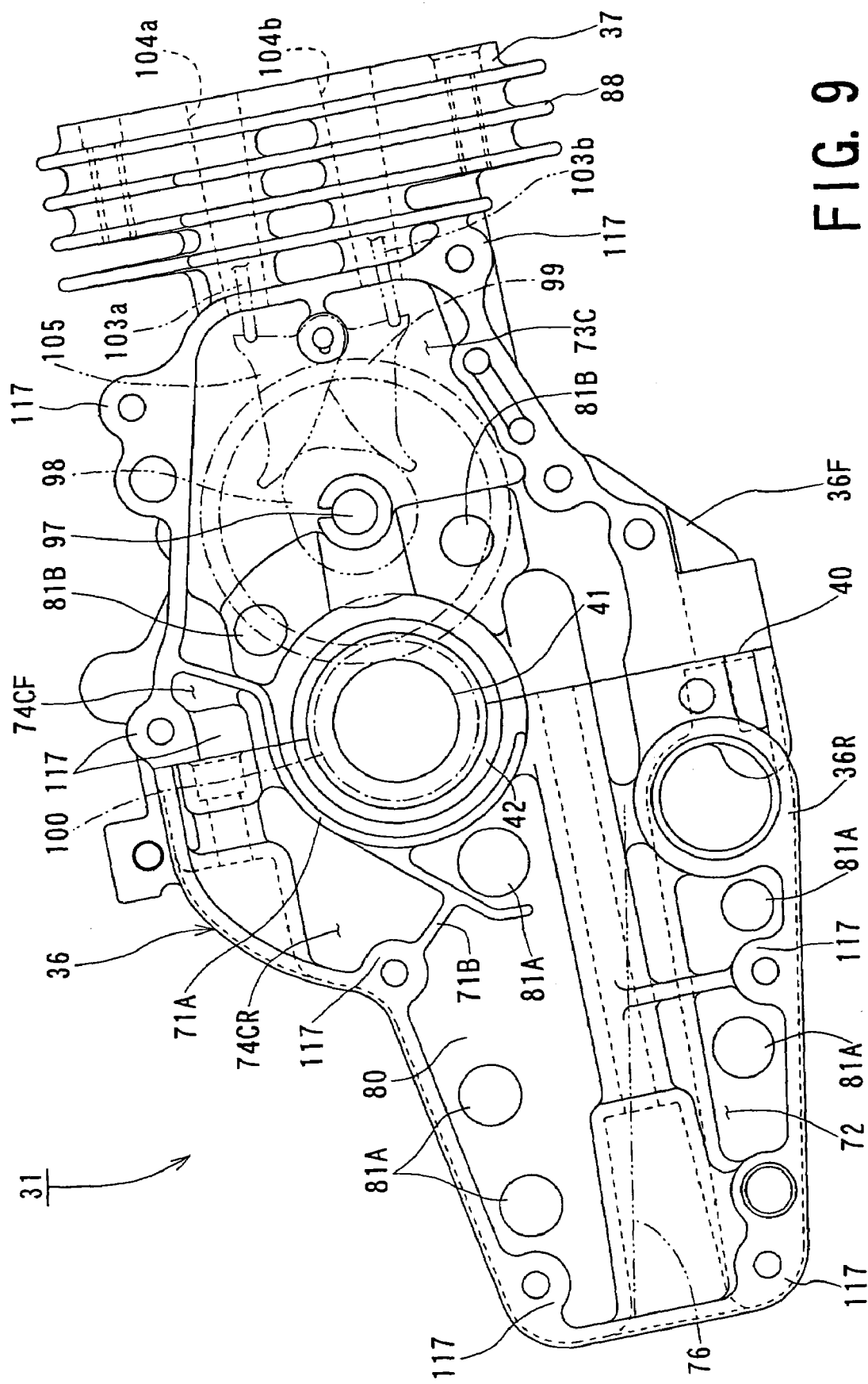
FIG. 9 is a right side elevational view of a crankcase, in a state of seeing the crankcase from a mating face to a magnet case.
Figure 10:
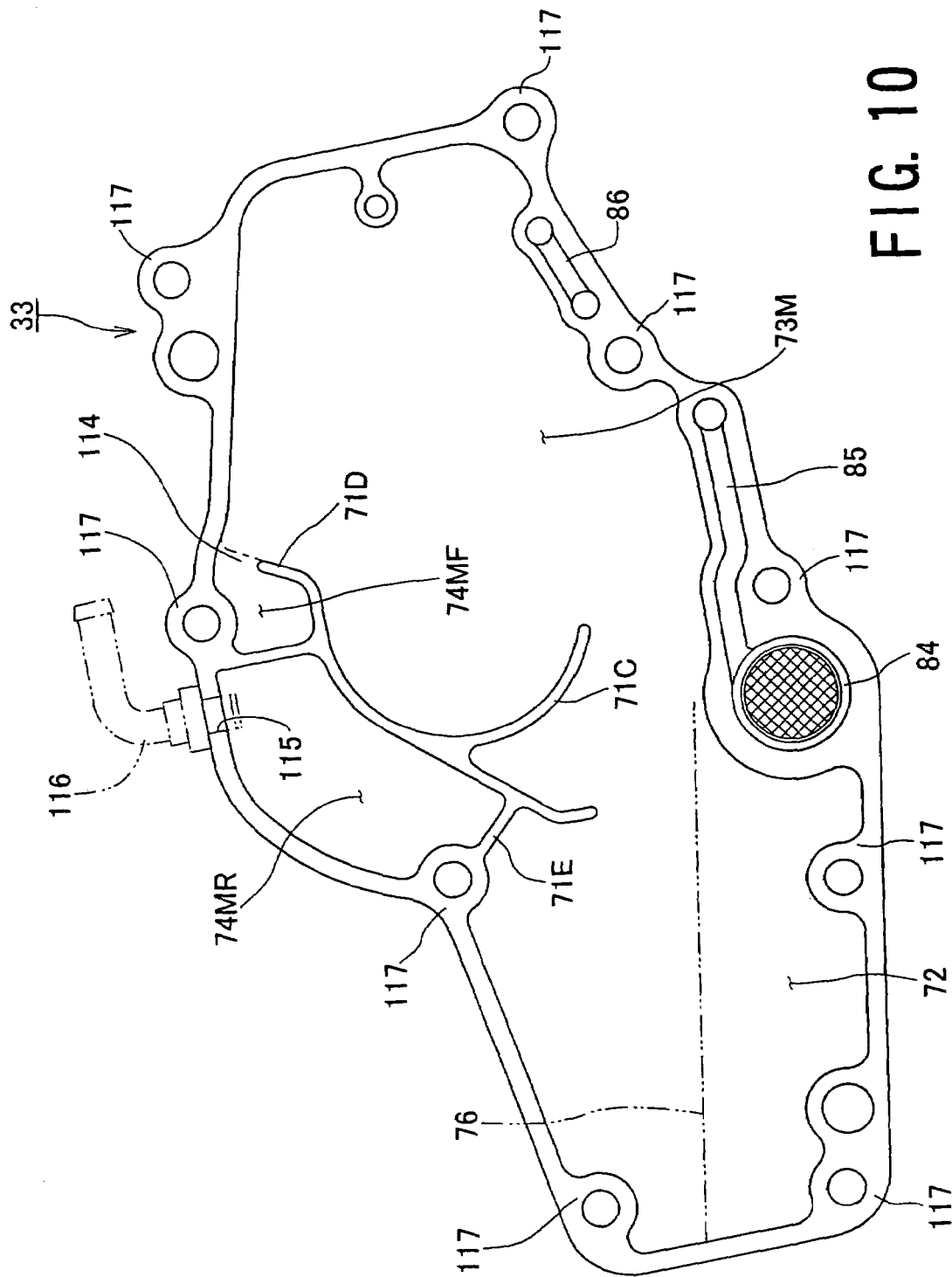
FIG. 10 is a perspective view of the magnet case, in a state of seeing through the mating face of the magnet case to the crankcase from a right side surface of the magnet case.
Figure 11:
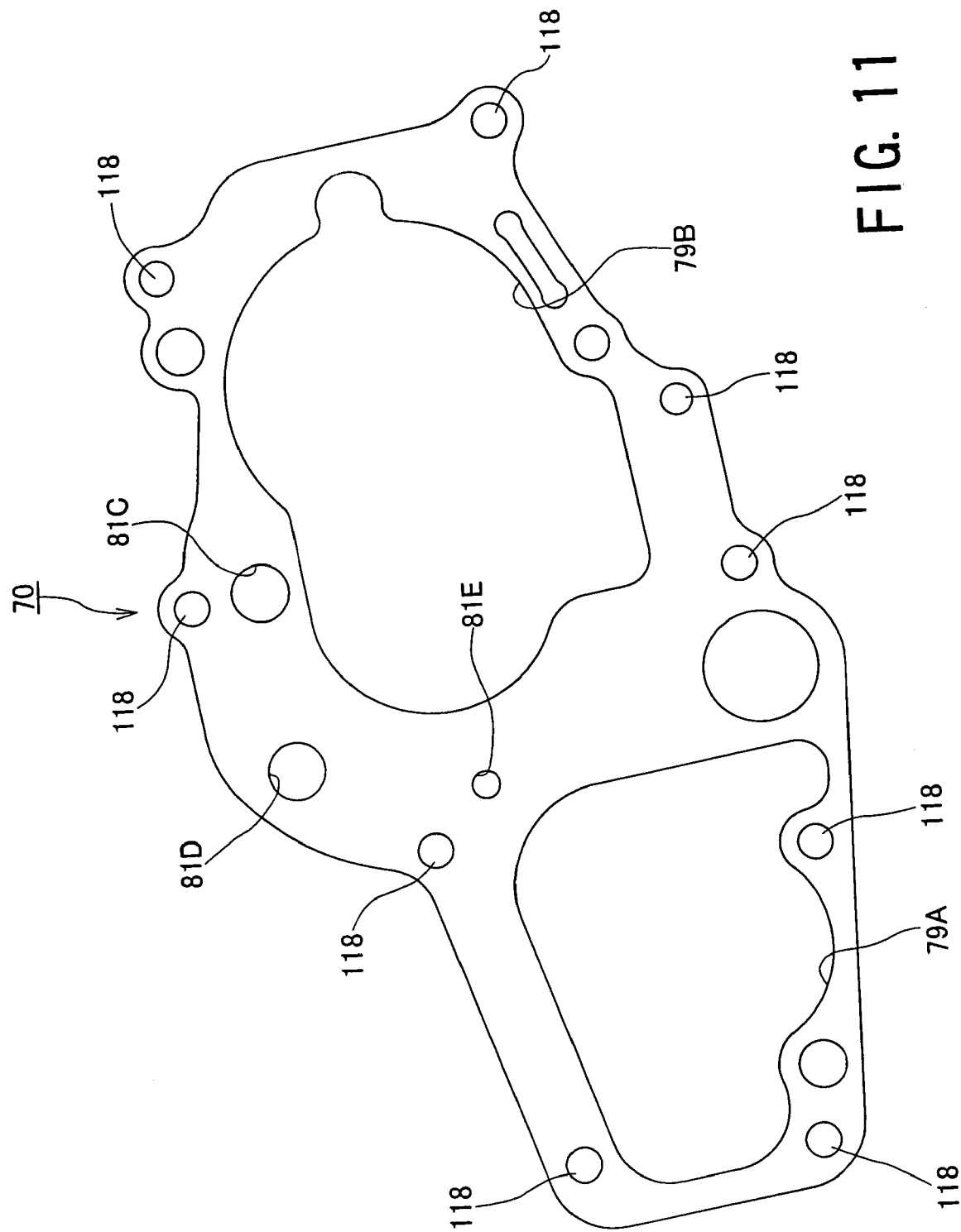
FIG. 11 is a right side elevational view of a gasket interposed between the crankcase and the magnet case.
Figure 12:
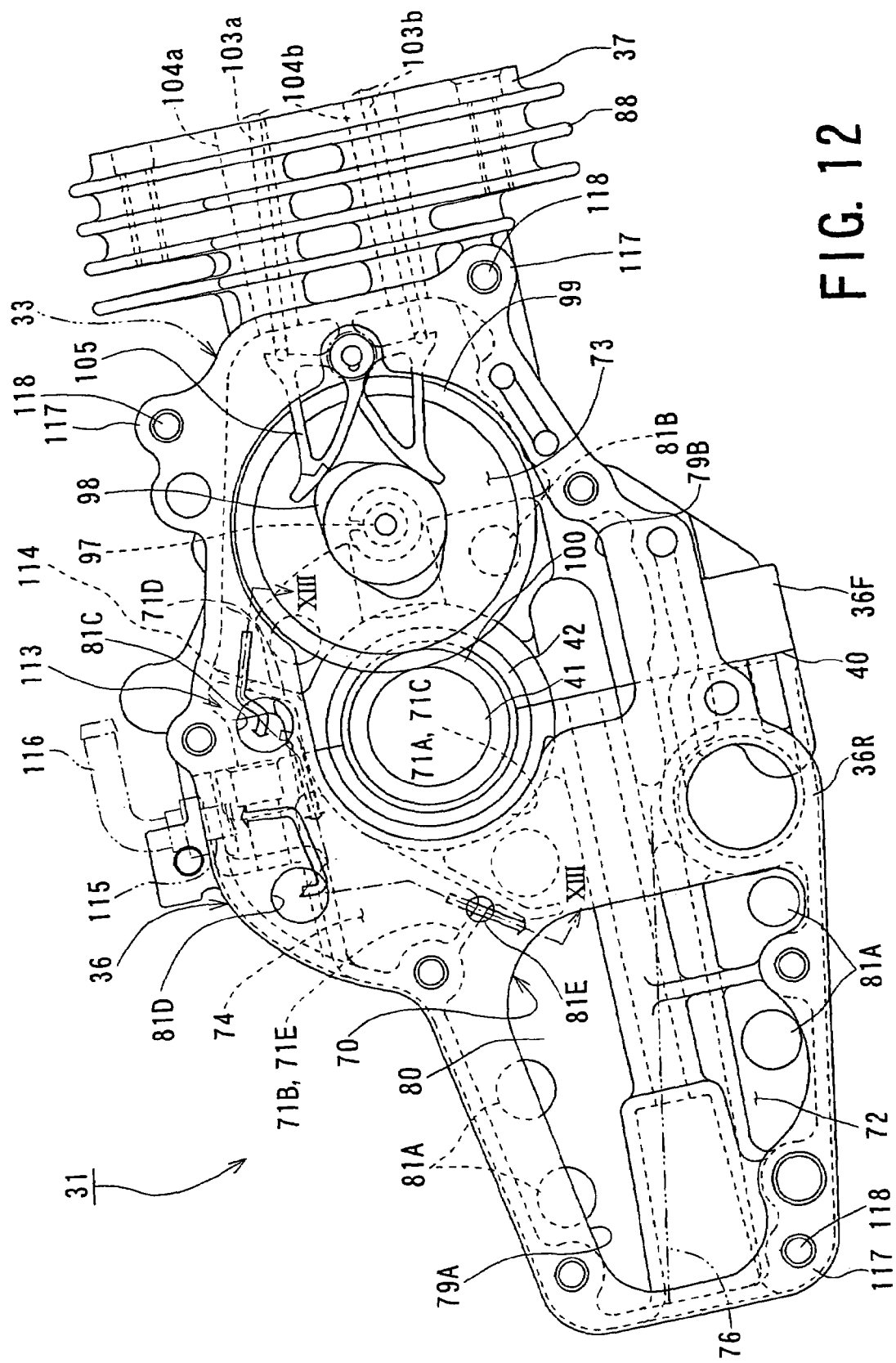
FIG. 12 is a perspective view of a state in which the magnet case is put on the crankcase via the gasket, as seen from a right side surface of the crankcase.
Figure 13:
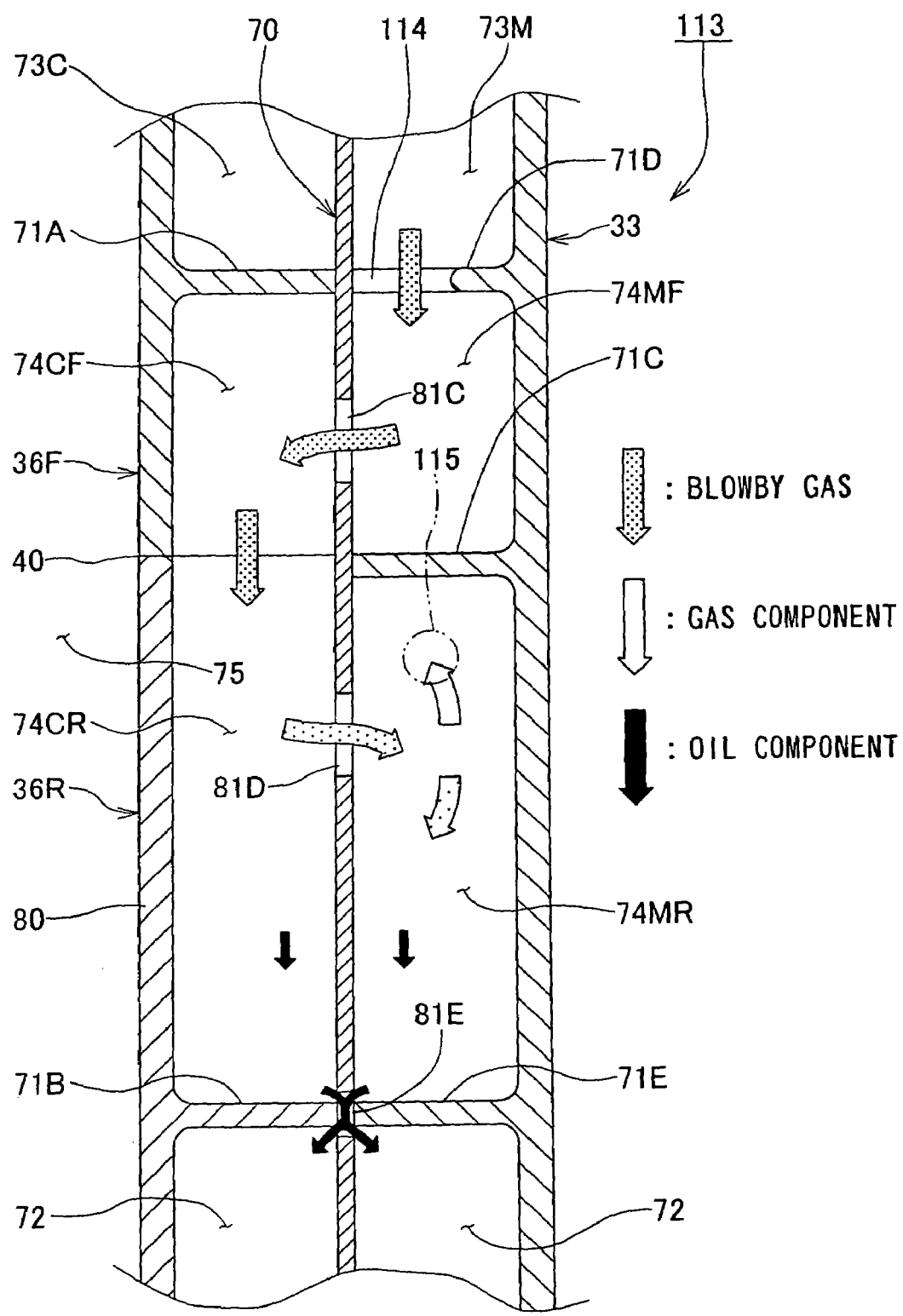
FIG. 13 is a cross sectional view taken along a line XIII—XIII in FIG. 12.

FIG. 9 is a right side elevational view of the crankcase 36 in a state of seeing the crankcase 36 from the mating face to the magnet case 33. FIG. 10 is a perspective view of the magnet case 33, in a state of seeing the mating face of the magnet case 33 to the crankcase 36 from the right side surface of the magnet case 33. FIG. 11 is a right side elevational view of a gasket 70 interposed between the crankcase 36 and the magnet case 33. FIG. 12 is a perspective view of a state in which the magnet case 33 is put on the crankcase 36 via the gasket 70, as seen from the right side surface of the crankcase 36. FIG. 13 is a cross sectional view taken along a line XIII—XIII in FIG. 12.

As shown in FIGS. 9, 12, and 13, an oil pan 72, a cam chamber 73 and a breather chamber 74 are formed in a space between the crankcase 36 and the magnet case 33 with holding the gasket 70 therebetween, by putting the magnet case 33 on the crankcase 36 via the gasket 70 and arranging reinforcing ribs 71A to 71E in both the cases 33 and 36.

Since the engine 31 is provided with sliding (slidable) portions and rotating (rotatable) portions inside the engine, a lubricating oil is supplied to each of these portions by utilizing a lubricating device, whereby a friction resistance in each of the portions can be reduced in accordance with the operation of the lubricating oil to thereby achieve an effective function of the engine 31 sufficiently.

The oil pan 72 constituting the lubricating device is integrally formed in the lower portions of the crankcase 36 (the front crankcase 36F on the front side and the rear crankcase 36R on the rear side, as shown, for example, in FIG. 9) and the magnet case 33 all around both the cases 33 and 36. Further, the oil pan 72 is arranged on the lower side of the crankshaft 41 just below from the front side of the crankshaft 41 and the rear side. The oil pan 72 is also formed in a lower portion of a crank chamber 75 receiving the crank web 41a of the crankshaft 41 (FIGS. 7 and 8).

As shown in FIG. 8, a lubricating oil 76 is regularly reserved near the mating face between the front crankcase 36F and the rear crankcase 36R near a position just below the crankshaft 41 in the oil pan 72, and a splash lubrication is executed by an oil scraper 77 constituting another lubricating device which extends from a large diameter end portion 45a of the connection rod 45 toward a lower side having a forward directing small angle.

An inner portion of the oil pan 72 is provided with a rib-shaped baffle plate, not shown, extending in a vertical direction and the vehicle width direction so as to separate the inner portion of the oil pan 72 into front and rear sides. The oil pan 72 is integrally provided with a rib-shaped baffle plate 78 (FIG. 8) extending from the front side toward the rear side and in the vehicle width direction so as to separate the inner portion into upper and lower sides.

Further, it is possible to restrain an excess swinging motion and deflection of the lubricating oil 76 caused by the oscillation of the vehicle in the front, rear, right, left, upward and downward directions during the vehicle traveling, by the baffle plates 78, and it is also possible to secure a good lubricating performance.

The rear lower portions of the rear crankcase 36R and the magnet case 33 extend out to the lower side of the drive shaft 58 (refer to FIGS. 6 and 8) and is structured so as to protect the drive sprocket 61 against the road surface, and it is hence possible to sufficiently secure the capacity of the rear oil pan 72 on the rear side of the crankshaft 41.

The oil pan 72 is separated into the right and left parts, that is, in the vehicle width direction, by the gasket 70 interposed between both the cases 33 and 36. However, the upper and lower sides of the oil surface are communicated through an opening portion 79A formed in the gasket 70 (FIGS. 11 and 12).

Furthermore, the oil pan 72 close to the crankcase 36 is sectioned into a side of the crank chamber 75 and an outer side thereof by means of partition wall 80, a communication port 81A is bored to the partition wall 80, and both the oil pans 72 are communicated on both the upper and lower sides of the oil surface (refer to FIG. 12).

As shown in FIG. 6, an oil filling port 82 for the lubricating oil 76 is provided to an upper corner portion of the rear side surface in the magnet case 33, and the oil filling port 82 and the drive chain 62 are respectively designed set so as to be arranged on the outer side of the vehicle body frame 2 and on the inner side of the vehicle body frame 2 in a state of mounting the power unit 30 to the vehicle body frame 2, though not shown in detail.

The crankshaft 41 is arranged so as to rotate toward the rear side, and the oil scraper 77 splashes the lubricating oil 76 within the oil pan 72 toward the upper side while pressing the lubricating oil 76 toward the front side, thereby making it possible to supply the lubricating oil 76 to each of the portions of the cylinder block 37 and the cylinder head 38 arranged on the front side of the crankshaft 41 (refer, for example, to FIG. 8).

Further, the entire engine 31 is lubricated through the supply of the oil in the form of a wave to each of the driving devices positioned on the lower side in the inner portion of the engine 31, and mixed wet atmosphere oil supply of the gas and the oil component (the oil mist) in the gas to each of the driving devices positioned on the comparatively upper side in the inner portion of the engine 31. In particular, a portion near an exhaust passage 83 (refer to FIG. 8, as mentioned below), at which a large amount of calorific power is generated, is arranged on the lower side of the vehicle, and an effective cooling performance can be achieved, as well as good lubricating performance at this position in comparison with the other positions.

In the embodiment mentioned above, although there is shown the example of the splash type oil lubricating method of the engine 31, it may be possible to adopt lubricating systems arranged in the inner portion of the magnet case 33 for intensive lubrication purposes. For example, as shown in FIG. 10, there may be adopted a structure in which a strainer 84 is provided so as to face to a bottom portion of the oil pan 72, an intake side oil passage 85 and an exhaust side oil passage 86 are formed in cooperation with the magnet case 33 and the gasket 70, and the lubricating oil is supplied to each of the portions of the engine 31 by using an oil pump, not shown.

The engine 31 used in the present embodiment is, for example, a four-stroke-cycle single cylinder engine of a small displacement (equal to or less than 125 cc, such as 50 cc) provided with an OHV type valve train 87 (FIG. 7), and an air-cooled type engine 31 which is provided with a plurality of cooling fins 88 in the cylinder block 37 and the cylinder head 38 (FIGS. 7, 9, and 12). In this case, the air-cooled cooling mechanism may be formed as a water-cooled type provided with a cooling system such as a water jacket or the like as occasion demands.

Figure 14:
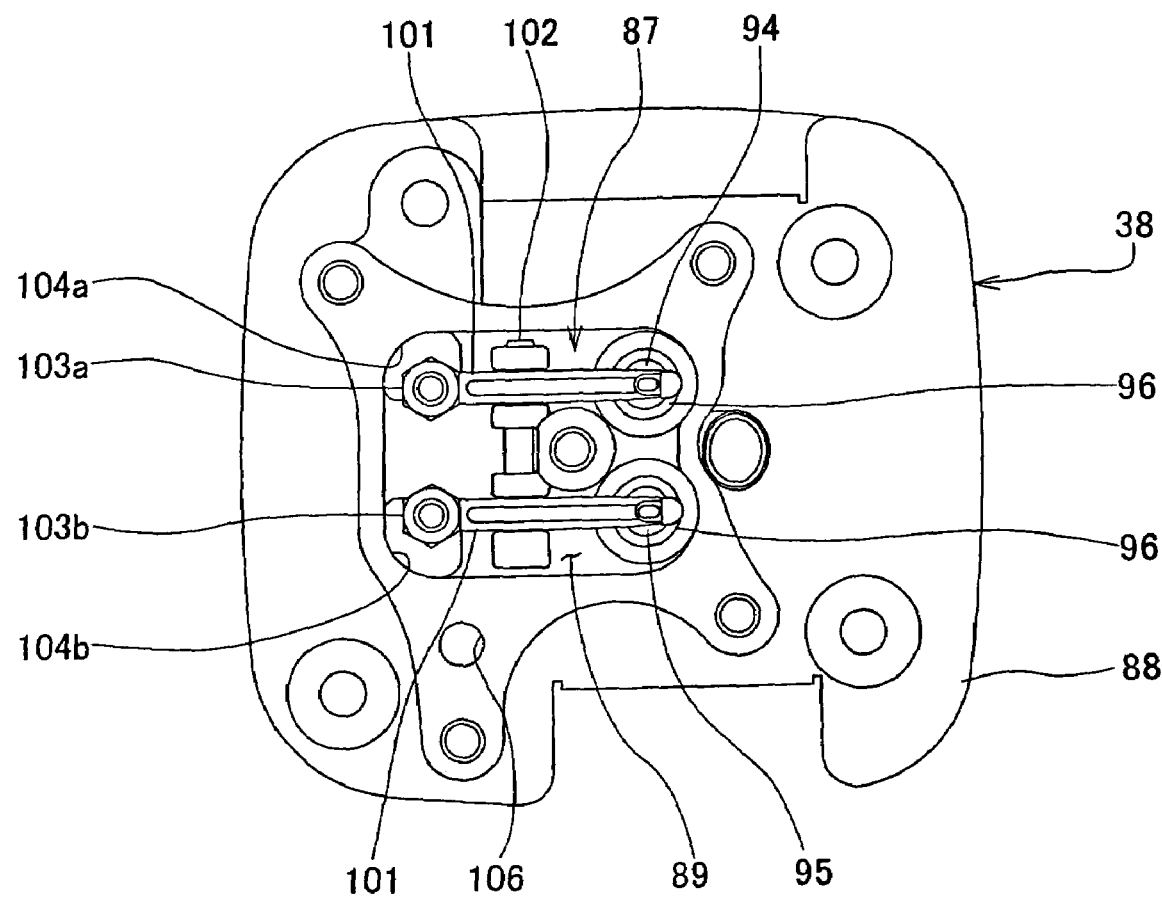
FIG. 14 is a view as seen from an arrow XIV in FIG. 8.

FIG. 14 is a view as seen in the direction of arrow XIV in FIG. 8. As shown in FIGS. 7, 8 and 14, a valve train chamber 89 receiving the valve train 87 is formed in a front portion of the cylinder head 38 and closed by a cylinder head cover 90. Further, a combustion chamber 91 is formed in the cylinder head so as to align with the cylinder 43, and an ignition plug 92 is connected to the combustion chamber 91 from an outer side.

An intake passage 93 and the exhaust passage 83, which are connected to the combustion chamber 91, are formed within the cylinder head 38. The intake passage 93 is open toward an upper side of the cylinder head 38, whereas the exhaust passage 83 is open toward a lower side of the cylinder head 38. Further, an intake valve 94 and an exhaust valve 95, which open and close both the passages 83 and 93, are provided within the cylinder head 38 in parallel to each other via a valve guide 96.

The cam chamber 73 (FIG. 7) is integrally formed in the front crankcase 36F and the upper portion of the front portion in the magnet case 33 so as to extend along both the cases 33 and 36. The cam chamber 73 is provided in parallel to the crank chamber 75 (FIG. 8) in an axial direction of the crankshaft 41 and is sectioned by the partition wall 80 (FIG. 9) which separates the oil pan 72 into the right and left sections, i.e., in the vehicle width direction. Furthermore, a communication port 81B (FIGS. 9 and 12) is bored in the partition wall 80 which sections the cam chamber 73 and the crank chamber 75, and both the chambers 73 and 75 are structured such that both the gas and the lubricating oil 76 can go and come, so that the cam chamber 73 forms another chamber which is communicated in adjacent to the crank chamber 75. The cam chamber 73 is separated into the right and left sections, i.e., in the vehicle width direction by the gasket 70 interposed between both the cases 33 and 36. However, they are communicated through an opening portion 79B (FIG. 11) formed in the gasket 70. In this case, one of the ball bearings 42 pivotally supporting the crankshaft 41 is supported by the partition wall 80 sectioning the cam chamber 73 and the crank chamber 75.

As shown in FIGS. 7, 9, and 12, a camshaft 97 is arranged in the cam chamber 73 in parallel to the crankshaft 41. A pair of valve moving cams 98 is provided on the camshaft 97 in adjacent thereto in an axial direction, and a cam driven gear 99 is provided as one united body or integrally provided with the camshaft 97. On the other hand, a cam drive gear 100 is provided as one united body or integrally provided with the crankshaft 41 on the crankshaft 41 just behind the cam driven gear 99. Furthermore, both the cam gears 99 and 100 are operatively connected to thereby transmit the rotating force of the crankshaft 41 to the camshaft 97.

A pair of rocker arms 101 constituting the valve train (valve moving mechanism) 87 are supported to the valve train chamber 89 within the cylinder head 38 to be swingable by a rocker shaft 102 which is provided in parallel to an approximately vertical surface passing through the cylinder axis 39 and offset to a right side, as shown in FIG. 7. The intake valve 94 and the exhaust valve 95 are also provided so that the valve axes are in parallel to the approximately vertical surface passing through the cylinder axis 39. Further, a pair of upper and lower push rods 103a and 103b (FIG. 12) are arranged so as to be in parallel and be offset to the right side with respect to the approximately vertical surface passing through the cylinder axis 39. The ignition plug 92 is provided so as to face to the combustion chamber 91 from an opposite side of the push rods 103a and 103b with respect to the cylinder axis 39.

A pair of upper and lower rod chambers 104a and 104b, which communicate the cam chamber 73 with the valve train chamber 89, are formed in a taper shape in the cylinder head 38 and the cylinder block 37 in a manner such that a cross sectional area becomes smaller from the valve train chamber 89 toward the cam chamber 73, as shown in FIG. 12. The rod chambers 104a and 104b are structured such that an upper side and a lower side are designed respectively as an intake push rod chamber 104a and an exhaust push rod chamber 104b, and the intake push rod 103a and the exhaust push rod 103b are inserted respectively thereinto.

The valve moving (train) cam 98 (FIG. 12) is operated to move forward and backward the push rods 103a and 103b by means of the cam follower 105 in the axial direction thereof in accordance with the rotation of the camshaft 97 and to swing the rocker arm 101. Further, the intake valve 94 and the exhaust valve 95 within the cylinder head 38 are operated so as to be opened and closed in accordance with the swinging motion of the rocker arm 101.

An oil passage 106 for introducing the lubricating oil 76 from the oil pan 72 to the valve train chamber 89 is formed to a position further below the exhaust push rod chamber 104b and close to the exhaust valve 95, as shown in FIG. 8. Furthermore, two rod chambers 104a and 104b mentioned above form the communication passage arranged so as to extend vertically as viewed within the cylinder head 38 and the cylinder block 37 and extend longitudinally forward and backward together with the oil passage 106.

In addition to the pressure feeding of the lubricating oil 76 in response to the rotation of the crankshaft 41, the lubricating oil 72 is smoothly supplied and discharged to and from the valve train chamber 89, through these three passages 104a, 104b and 106, in accordance with the oil oscillation and flow caused by the acceleration and deceleration of the vehicle.

All of these three passages 104a, 104b and 106 are opened to the valve train chamber 89 in one end, other ends of two upper and lower rod chambers 104a and 104b are opened to the cam chamber 73, and another end of the oil passage 106 is opened to the crank chamber 75, respectively, so that it is possible to preferably secure the circulating performance of the droplet and atomized lubricating oil 76.

When employing the method of using the oil pump mentioned above for the lubricating method of the engine 31, the structure can be simplified so as to restrain an occupied space, for example, by coaxially arranging the oil pump with the camshaft 97 so as to drive the oil pump thereby. The oil passage 106 introducing the lubricating oil 76 from the oil pan 72 mentioned above to the valve train chamber 89 may be connected to the oil pump.

As shown in FIGS. 1 and 3, a portion 22b bulged so as to extend upward in the longitudinal (forward and backward) direction is formed in a center portion of the rear half portion of the step board in the width direction, and the intake system 51 is arranged in the upper portion of the power unit 30 within the bulge portion 22b. As shown in FIG. 1, the intake system 51 is mainly constituted by a carburetor 107, and an air cleaner 108 connected to an upstream side (rear portion) of the carburetor 107 by an outlet pipe, not shown, and an intake pipe 109 extends from a downstream side (front portion) of the carburetor 107 toward a front side so as to be connected to an intake passage 93 (FIG. 8) on an upper surface of the cylinder head 38 from the upper side thereof.

On the other hand, as shown in FIGS. 1, 3 and 4, an exhaust system 110 is arranged on the lower side of a front half portion of the step board. The exhaust system 110 is constituted by an approximately cylindrical muffler 111 which is arranged in an offset manner on the right side below the step board portion 22a and extends in the longitudinal direction of the vehicle along the step board portion 22a.

An exhaust pipe 112 which is connected to the exhaust passage 83 of the cylinder head 38, temporarily extends obliquely toward the front downward side, thereafter, extends approximately horizontally in the left side of the muffler 111 toward the front side, is bent approximately in U-shape toward the rear side at the rear portion of the front wheel 10 and is then connected to a front end of the muffler 111.

In the four-stroke-cycle engine 31, the gas of a pressure generated in the combustion chamber 91, that is, the blowby gas, leaks in the crank chamber 75 little by little with passing through the gap between the piston 44 and the cylinder 43.

Further, the power unit 30 shown in the present embodiment is provided with a breather device 113 corresponding to a mechanism so as to separate the blowby gas into gas and liquid so as to reflow the gas component to the intake system 51, in general, the air cleaner 108, to again feed to the combustion chamber 91 so as to reheat, and to reflow the oil component to the oil pan 72. The breather device 113 is illustrated in detail in FIG. 13 and FIG. 15 illustrates the relationship of the breather device 113 with respect to other engine parts, such as the crank case 31, the cam chamber 73, the magnet case 33.

As shown in FIGS. 13 and 15, the cam chamber 73 in the connection portion between the front crankcase 36F and the magnet case 33 is sectioned into a cam chamber 73C close to the crankcase 36 and a cam chamber 73M close to the magnet case 33 by the gasket 70 interposed between the crankcase 36 and the magnet case 33, which are communicated with each other through an opening 79B formed to the gasket 70.

The breather chamber 74 constituting the breather device 113 is formed on the upper side of the cam chamber 73 of the connection portion between the crankcase 36 and the magnet case 33. The breather chamber 74 is sectioned into a breather chamber 74C close to the crankcase 36 and a breather chamber 74M close to the magnet case 33 by the gasket 70, as shown in FIGS. 13 and 15.

The breather chamber 74C close to the crankcase 36 is arranged all around the front crankcase 36F and the rear crankcase 36R, as shown in FIGS. 9, 12, 13, and 15 so as to form a front breather chamber 74CF and a rear breather chamber 74CR. Furthermore, the breather chamber 74C is sectioned into the oil pan 72 and the cam chamber 73 by a rib 71A provided on the rear side around the crankshaft 41 and a rib 71B extending from the rib 71A toward a peripheral edge portion of the rear crankcase 36R.

On the other hand, the breather chamber 74M close to the magnet case 33 is sectioned into the oil pan 72 and the cam chamber 73 by a rib 71C provided on the rear side around the crankshaft 41 and front and rear ribs 71D and 71E extending from the rib 71C toward a peripheral edge portion of the magnet case 33, as shown in FIGS. 10 and 13.

The breather chamber 74M is sectioned into a front breather chamber 74MF and a rear breather chamber 74MR by a rib 71F extending toward the peripheral edge portion of the magnet case 33 from the rib 71C. The rib 71C is arranged on the rear side around the crankshaft 41 between the front and rear ribs 71D and 71E extending from the rib 71C provided on the rear side around the crankshaft 41 toward the peripheral edge portion of the magnet case 33.

The front rib 71D extending from the rib 71C provided on the rear side around the crankshaft 41 toward the peripheral edge portion of the magnet case 33 is formed with a notch 114 corresponding to a main opening of the breather chamber 74 which communicates the front breather chamber 74MF with the cam chamber 73, as shown in FIGS. 13 and 15.

As shown in FIGS. 13 and 15, a communication port 81C, which communicates the front breather chamber 74MF disposed near the magnet case 33 with the front breather chamber 74CF disposed near the crankcase 36, is formed in the gasket 70. On the other hand, a communication port 81D, which communicates the rear breather chamber 74CR close to the crankcase 36 with the rear breather chamber 74MR close to the magnet case 33, is formed therein.

A communication port 81E, which communicates the rear breather chamber 74CR disposed close to the crankcase 36 and the rear breather chamber 74MR disposed close to the magnet case 33 with the oil pan 72 as shown in FIG. 11, is formed in the gasket 70 so as to overlap with the rib 71B. The rib 71B extends from the rib 71A provided on the rear side around the crankshaft 41 close to the crankcase 36 toward the peripheral edge portion of the rear crankcase 36R, and the rear rib 71E also extends from the rib 71C provided on the rear side around the crankshaft 41 close to the magnet case 33 toward the peripheral edge portion of the magnet case 33.

In this case, the communication port 81E for communicating the rear breather chamber 74CR close to the crankcase 36 and the rear breather chamber 74MR close to the magnet case 33 with the oil pan 72 is designed so as to have a diameter smaller than those of the other communication ports 81C and 81D provided in the gasket 70. This communication port 81E is arranged near the lowest end of the breather chamber 74.

A gas discharge port 115 (FIGS. 10 and 12) is formed at the peripheral edge portion of the magnet case 33 above the rear breather chamber 74MR close to the magnet case 33, and a breather unit 116 is connected to the gas discharge port 115 from the outer side thereof. In this arrangement, a breather pipe, not shown, extends toward the air cleaner 108 from the breather unit 116.

As shown in FIGS. 9, 10 and 12, a plurality of bolt bosses 117 for bolts, not shown, for connecting the front crankcase 36F, the rear crankcase 36R, the crankcase 36 and the magnet case 33 are provided near the mating face between the front crankcase 36F and the rear crankcase 36R and the peripheral edge portions of the crankcase 36 and the magnet case 33. Further, as shown in FIG. 11, insertion holes 118 for the bolts mentioned above are formed to the gasket 70 so as to correspond to the respective bolt bosses 117.

The breather device of the present invention of the structure mentioned above will operate in the following manner. Flow paths are generally illustrated in FIGS. 13 and 15.

The gas of the pressure generated in the combustion chamber 91, that is, the blowby gas, leaks out into the crankcase 36 little by little through the gap between the piston 44 and the cylinder 43 in accordance with the operation of the engine 31. The blowby gas contains the gas component and the oil component (the oil mist), and flows, for example, into the cam chamber 73 from the crank chamber 75 via the communication port 81B formed in the partition wall 80 sectioning the cam chamber 73 and the crank chamber 75.

The blowby gas flowing into the cam chamber 73 flows into the front breather chamber 74MF from the cam chamber 73M through the notch 114 corresponding to the main opening of the breather chamber 74 provided to the front rib 71D, as shown in FIGS. 12 and 13, and then flows into the front breather chamber 74CF and the rear breather chamber 74CR disposed close to the crankcase 36 from the communication port 81C provided to the gasket 70.

The blowby gas flowing into the breather chamber 74C close to the crankcase 36 then flows into the rear breather chamber 74MR close to the magnet case 33 from the communication port 81D provided in the gasket 70. The blowby gas is separated into the gas component and the oil component (the oil mist) during the reciprocation between the breather chamber 74C close to the crankcase 36 and the breather chamber 74M close to the magnet case 33 with holding the gasket 70 therebetween as mentioned above.

Accordingly, the gas component is discharged from the gas discharge port 115 above the rear breather chamber 74MR close to the magnet case 33 so as to flow back to the air cleaner 108 via the breather union 116 and the breather pipe, not shown, and is fed again to the combustion chamber 91 so as to be reheated.

Furthermore, the oil component (the oil mist) forms the droplet and flows back to the oil pan 72 from the communication port 81E for communicating the rear breather chamber 74CR and the rear breather chamber 74MR with the oil pan 72.

The cam chamber 73 is provided to the connection portion between the crankcase 36 and the magnet case 33 corresponding to another case in parallel to the crank chamber 75 in the axial direction of the crankshaft 41. The cam chamber 73 is also sectioned by the partition wall 80 separating the oil pan 72 into right and left sections. The breather chamber 74 constituting the breather device 113 is formed above the cam chamber 73. It is therefore possible to effectively utilize the dead space around the cam chamber 73 in comparison with the locus of the crank web 41a received in the crank chamber 75.

As a result, it is possible to restrict the vertical size of the engine 31, shorten the axial size of the crankshaft 41 including the auxiliary machine such as the magnet device 69, make the power unit 30 compact, prevent the interference with the road surface even when a vehicle having the comparatively small-diameter wheels 10 and 17 such as of the present invention is tilted, and secure a sufficient bank angle.

Since the floor surface of the step board portion 22a does not ascend even in the case that the power unit 30 is disposed on the lower side of the step board portion 22a, the rider's usability is not deteriorated. Further, since the ball bearing 42 axially supporting the crankshaft 41 is supported by the partition wall 80 sectioning the cam chamber 73 and the crank chamber 75, it is possible to obtain a high rigidity of the crankshaft 41.

Since the breather chamber 74 is arranged in adjacent to the upper portion of the cam chamber 73, not the crank chamber 75, as the other chamber adjacently communicated to the crank chamber 75, and the main opening (i.e., notch 114) of the breather chamber 74 is disposed so as to oppose to the cam chamber 73, it is possible to reduce the amount of the oil component (the oil mist) in the blowby gas flowing into the breather chamber 74 and to restrain the oil component from flowing out to the intake system 51.

Furthermore, on the basis of the structure of the breather chamber 74 using a plurality of ribs 71A to 71E and communication ports 81C to 81E utilizing the gasket 70 interposed between the crankcase 36 and the magnet case 33, it is possible to realize the labyrinth structure having the high gas-liquid separating performance while comparatively simplifying the structure of both the cases 33 and 36 themselves.

Moreover, since each of the portions of the engine 31 is lubricated by the oil component in the blowby gas through the splash lubrication by the oil scraper 77 provided to the large end portion 45a of the connection rod 45 in the crank chamber 75, it is possible to achieve the gas-liquid separating effect greater than that achieved by the forced lubricating method.

On the other hand, the communication port 81E for communicating the breather chamber 74 and the oil pan 72 with the gasket 70 is arranged near the lowest end of the breather chamber 74. The communication port 81E is formed so as to overlap with the rib 71B and the rib 71E sectioning the breather chamber 74 from the oil pan 72 and to have the smaller diameter than the other communication ports 81C and 81D provided in the gasket 70. Accordingly, the oil component (the oil mist) separated from the blowby gas in the breather chamber 74 forms the droplet so as to flow back to the oil pan 72 through the communication port 81E.

With structure for relieving the separated oil component, in addition to the communication port 81E formed in the gasket 70, the opening area of the communication port 81E is narrowed by the rib 71B and the rib 71E in both the cases 33 and 36, so that the flowing of the blowby gas into the breather chamber 74 in the opposite direction to the relief of the oil component can achieve high efficiency. Moreover, it is easy to form the opening in the gasket 70 and to control the position thereof, and it is also possible to restrain the oil component from flowing out to the intake system 51.

Furthermore, since the gasket 70 is continuously provided up to the bottom portions of both the cases 33 and 36, the relief of the separated oil component descends as the wall flow along the gasket 70 and never ascend again.

The cam chamber 73 is separated into the right and left sections by the gasket 70 interposed between the crankcase 36 and the magnet case 33, and is communicated by the opening portion 79B formed in the gasket 70. The main opening (the notch 114) of the breather chamber 74 is provided on the side of the breather chamber 74M close to the magnet case 33. According to this arrangement, the main opening (the notch 114) of the breather chamber 74 is positioned to the place sectioned and formed as the other chamber from the cam chamber 73, which is formed as another chamber from the crank chamber 75, the labyrinth structure is further complicated and the gas-liquid separating performance can be further enhanced.

Since the position at which main opening (i.e., notch 114) of the breather chamber 74 is positioned is different from the position at which the sliding or rotating device are accommodated, the oil component can be prevented from flowing into the breather chamber 74 in an improved manner.

Furthermore, the engine 31 performs the splash lubrication within the crank chamber 75, it is possible to provide the oil passage 106 introducing the lubricating oil 76 from the oil pan 72 in the crank chamber 75 to the valve train chamber 89 of the cylinder head 38. The rod chambers 104a and 104b for inserting the push rods 103a and 103b formed by communicating the valve train chamber 89 with the cam chamber 73 are formed as the communicating passage for the lubricating oil 76 and the blowby gas from the valve train chamber 89. Accordingly, it is possible to temporarily buffer the blowby gas not only from the crank chamber 75 but also from the valve train chamber 89 in the cam chamber 73 so as to take in the breather chamber 74. It is also possible to improve the gas-liquid separating performance.

Still furthermore, the breather chamber 74 is formed so as to face to the mating face between the crankcase 36 constituted by a plurality of cases, that is, the front crankcase 36F, the rear crankcase 36R and the magnet case 33. Therefore, the ribs 71A to 71E can be provided in correspondence to the position of the mating face at a time of mating the magnet case 33 to the crankcase 36 from the direction of the mating face. It is possible to secure the sealing property of these three cases near the bonding position and also possible to improve a sound insulating property.

Further, since the bolt bosses 117 for the bolts for connecting these three cases are provided in the orthogonal two directions, the internal shapes of these three cases become complex, which can contribute to the labyrinth structure having the high gas-liquid separating performance.

On the other hand, the power unit 30 is not covered entirely by the vehicle body cover 20, and the exhaust system 110 is arranged separately in the front side of the power unit 30. Therefore, the breather chamber 74 formed along the outer surface of the magnet case 33 tends not to be affected to the heat of the engine 31 and the exhaust gas and is cooled by the ambient air, so that the high gas-liquid separating performance is obtainable. Furthermore, since the rod chambers 104a and 104b for inserting the push rods 103a and 103b used as the communicating passage of the blowby gas are formed in the cylinder block 37 and the cylinder head 38 provided with the cooling fin 88, the gas-liquid separating performance in the rod chambers 104a and 104b can be also improved.

Still furthermore, the oil pan 72 is separated into the right and left sections, that is, in the vehicle width direction, it is possible to make small the size of the crank chamber 75 in the vehicle width direction, so that even when the vehicle is tilted during the traveling, the amount of swing motion of the lubricating oil 76 inside the oil pan 72 becomes less. In this case, in order to prevent the lubricating oil 76 from swinging, the baffle plate 78 and the gasket 70 will contribute.

What is claimed is:

1. A breather device of an engine comprising a first case, a crankcase, an intake system, a cam chamber having a cam configured to drive a valve train disposed on a cylinder head of the engine, a crankshaft, and a crank chamber, the breather device, comprising:

a first portion disposed in the crankcase;

a second portion disposed in the first case, the second portion comprising a main opening and a gas discharge port connected to the intake system, and the main opening facing the cam chamber;

a gasket having first and second communication ports, the gasket being disposed between the first and second portions of the breather device and being configured to allow flow communication therebetween via the first and second communication ports; and an oil outlet, wherein an oil and a gas in a blowby mixture entering the breather device through the main opening and flowing through the first and second portions and the first and second communication ports are separated from each other, the separated gas leaving the breather device through the gas discharge port, and the separated oil leaving the breather device through the oil outlet.

2. The breather device according to claim 1, wherein said cam chamber is separated into a first chamber communicated with a valve train chamber receiving the valve train and a second chamber by the gasket, the first and second chambers being in communication through an opening portion formed in the gasket, and the main opening of the second portion being arranged on the second chamber side.

3. The breather device according to claim 1, wherein the engine comprises an oil passage for introducing the oil from an oil pan within the crank chamber to the valve train chamber, and a communication passage for communicating the valve train chamber with the cam chamber is formed so as to communicate the oil and the blowby gas from the valve train chamber.

4. The breather device according to claim 1, wherein said first portion comprises a front crankcase section and a rear crankcase section, the second portion comprises a magnet case connected from a side portion of the crankcase, and the breather chamber is formed so as to face mating faces of the front crankcase section, the rear crankcase section, and the magnet case.

5. A breather device of an engine comprising a first case, a crankcase, an intake system, a cam chamber having a cam configured to drive a valve train disposed on a cylinder head of the engine, a crankshaft, and a crank chamber, the breather device, comprising:
   means for separating an oil and a gas in a blowby mixture entering the breather device.

6. The breather device according to claim 5, wherein said cam chamber is separated into a first chamber communicated with a valve train chamber receiving the valve train and a second chamber by a gasket, the first and second chambers being in communication by an opening portion formed in the gasket, and a main opening of the means for separating being formed so as to face to the cam chamber and being arranged in the second chamber side.

7. The breather device according to claim 5, wherein the engine comprises an oil passage for introducing the oil from an oil pan within the crank chamber to the valve train chamber, and a communication passage for communicating the valve train chamber with the cam chamber is formed so as to communicate the oil and the blowby gas from the valve train chamber.

8. The breather device according to claim 5, wherein said means for separating comprises a front crankcase section, a rear crankcase section, and a magnet case connected to a side portion of the crankcase, and the means for separating is formed so as to face mating faces of the front crankcase section, the rear crankcase section, and the magnet case.

9. The breather device according to claim 1, wherein the cam chamber is disposed at a connection portion of the first case and the crankcase adjacent to the crank chamber in an axial direction of the crankshaft.

10. The breather device according to claim 5, wherein the means for separating is sectioned in a region adjacent to the crank chamber and is arranged adjacent to an upper side of a communication chamber, a main opening of the means for separating is formed so as to face the communication chamber, a communication port for communicating the breather chamber and an oil pan is arranged near a lowermost end of the means for separating, and the communication port is formed by a rib defining the means for separating from the oil pan so as to reflow the oil subjected to a gas-liquid separation in the means for separating from the communication port to the oil pan.

* * * * *